(12) United States Patent
Helfinstine

(10) Patent No.: US 11,729,154 B2
(45) Date of Patent: Aug. 15, 2023

(54) SYSTEMS AND METHODS FOR NETWORK PRIVACY

(71) Applicant: Comcast Cable Communications, LLC, Philadelphia, PA (US)

(72) Inventor: Charles A. Helfinstine, Wynnewood, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/249,285

(22) Filed: Feb. 25, 2021

(65) Prior Publication Data

US 2022/0272078 A1 Aug. 25, 2022

(51) Int. Cl.
  *H04L 9/40* (2022.01)
  *H04L 9/32* (2006.01)
  *H04L 67/02* (2022.01)
  *H04L 67/52* (2022.01)

(52) U.S. Cl.
  CPC ........ *H04L 63/0471* (2013.01); *H04L 9/3268* (2013.01); *H04L 63/0428* (2013.01); *H04L 63/0478* (2013.01); *H04L 63/166* (2013.01); *H04L 67/02* (2013.01); *H04L 67/52* (2022.05)

(58) Field of Classification Search
  None
  See application file for complete search history.

(56) References Cited

U.S. PATENT DOCUMENTS

| | | | |
|---|---|---|---|
| 10,924,456 B1* | 2/2021 | Moore | H04L 61/4511 |
| 11,159,656 B2* | 10/2021 | Michon | H04L 12/1804 |
| 2015/0288663 A1* | 10/2015 | Watanabe | H04L 63/166 380/28 |
| 2016/0134594 A1* | 5/2016 | Teo | H04L 63/0428 713/171 |
| 2017/0359317 A1* | 12/2017 | Anderson | H04L 9/14 |
| 2019/0182223 A1* | 6/2019 | Wang | H04L 67/02 |
| 2020/0028673 A1* | 1/2020 | Howe | H04L 9/0838 |
| 2020/0059780 A1* | 2/2020 | Hess | H04L 63/061 |
| 2020/0274812 A1* | 8/2020 | Ouyang | H04L 63/1408 |
| 2020/0412750 A1* | 12/2020 | Doron | H04L 63/1425 |
| 2021/0194927 A1* | 6/2021 | Adel | H04L 63/0245 |
| 2021/0367921 A1* | 11/2021 | Baum | H04L 12/2829 |
| 2022/0116370 A1* | 4/2022 | Tate | H04L 12/2801 |

\* cited by examiner

Primary Examiner — Lashonda Jacobs-Burton
(74) Attorney, Agent, or Firm — BakerHostetler

(57) ABSTRACT

A privacy gateway may communicate with user devices located at a plurality of premises. The privacy gateway may receive a data packet, from one of the user devices, indicating destinations, such as other computing devices, located external to the premises. The privacy gateway may decrypt at least a portion of the data packet to determine that at least a portion of data in the packet is associated with the user device. The privacy gateway may remove the data associated with the user device from the data packet and replace the removed data with data associated with the privacy gateway. The privacy gateway may send the data packet with the replaced data to a destination device. The privacy gateway may receive a response to the data packet from the destination device. The privacy gateway may encrypt a portion of the response and send the response to the user device.

20 Claims, 8 Drawing Sheets

SYSTEMS AND METHODS FOR NETWORK PRIVACY

BACKGROUND

User network behavior and internet traffic may be tracked. For example, computing devices may communicate via a network, such as the Internet. The computing devices may communicate by sending and/or receiving data packets. The data packets may comprise information that is tracked, such as an address of a computing device, a location of the computing device, information associated with a user of the computing device, and/or contents of a message. Although use of an anonymity network and/or encryption of packet data may provide some privacy from monitoring devices, popular communication protocols, such as hypertext transfer protocol secure (HTTPS), may require that at least some of the data in a packet remain unencrypted and may not prevent a monitoring device from determining general information about a communication session. Therefore, improvements in network privacy are needed.

SUMMARY

One or more user devices may be located at a premises. In order to communicate with one or more computing devices located external to the premises, such as web servers, one or more of the user devices may send an encrypted data packet to a gateway device. The gateway device may comprise a privacy gateway. The privacy gateway may comprise another computing device located external to the premises. The privacy gateway may maintain communication sessions with a plurality of user devices located at a plurality of premises. The privacy gateway may decrypt at least a portion of data in the encrypted data packet. The privacy gateway may determine that at least a portion of the decrypted data is associated with the user device, such an address of the user device and/or data associated with a user of the user device or data associated with the premises. The privacy gateway may remove the data associated with the user device from the packet and add data associated with the privacy gateway. The privacy gateway may re-encrypt at least a portion of the packet. The privacy gateway may initiate a communication session with another computing device, such as one or more of the computing devices located external to the premises, and the other computing device may receive the packet with the added data. As a result, the other computing device and/or a monitoring device may not be able to determine the data associated with the user device and/or that the packet is associated with the premises by tracking the packet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
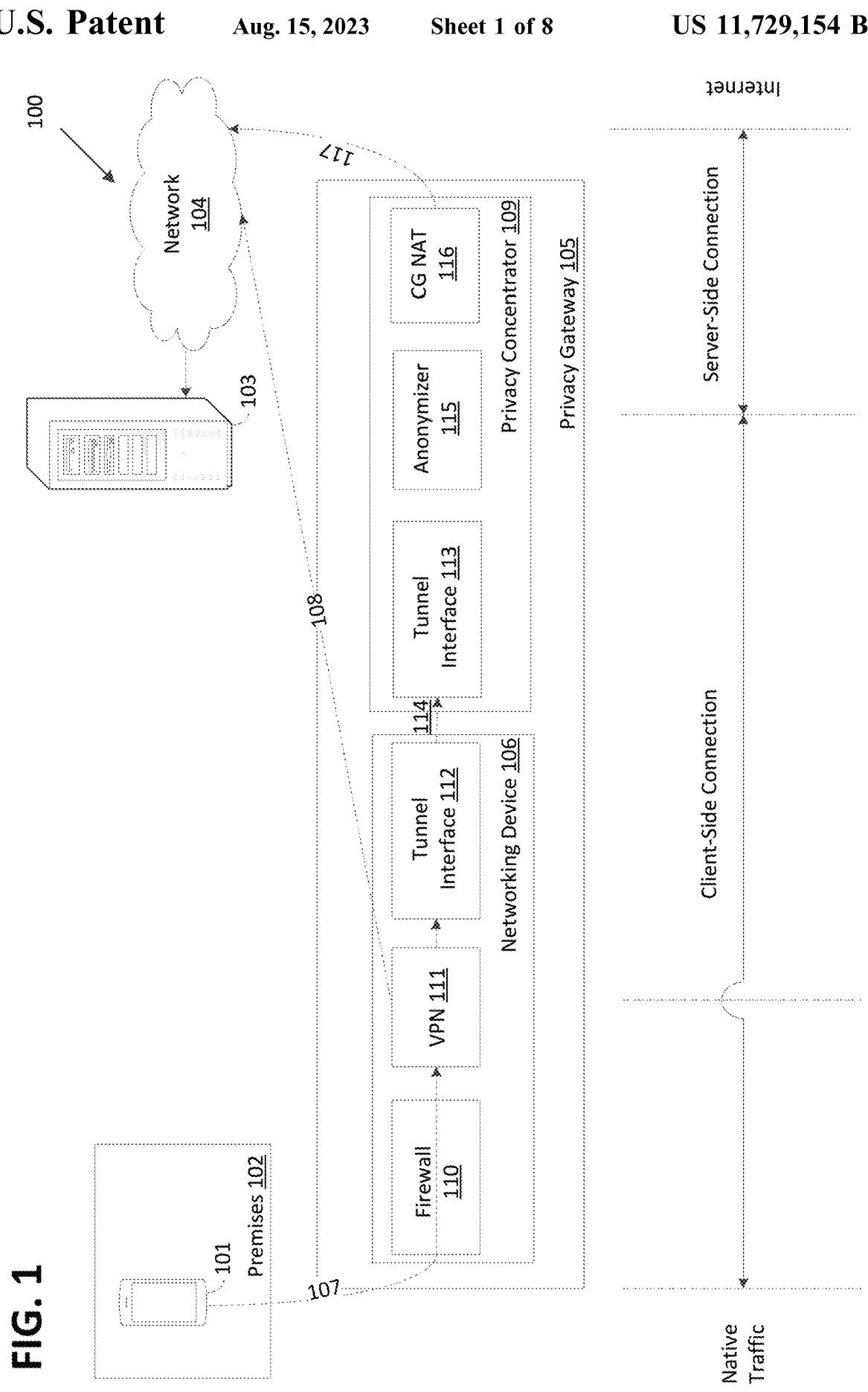
FIG. 1 shows an example system.

FIG. 1 shows an example system 100. The system 100 may comprise one or more user devices 101. The user device 101 may comprise a mobile device, such as a mobile phone, a laptop computer, a tablet device, and/or a wearable device, as examples. The user device 101 may comprise a premises management system device, such as a sensor device, a camera device, a lighting device, an alarm device, a speaker device, a microphone device, a communication device, a gateway device, a control panel device, a smart home device, an appliance, an internet of things (IoT) device, and/or an automation device, as examples. The user device 101 may comprise one or more entertainment devices, such as a set-top box and/or a television. The user device 101 may comprise a router.

The user device 101 may be located at a premises 102. The premises 102 may comprise a residential premises, such as a house, an apartment, a condominium, and/or a mobile house. The premises 102 may comprise a group of residential premises, such as a neighborhood, an apartment building, and/or a hotel. The premises 102 may comprise a commercial premises, such as an office, a warehouse, and/or a retail shop. The premises 102 may comprise a group of commercial premises, such as a retail complex and/or a corporate campus. The premises 102 may comprise an educational premises, such as a school or a university. The premises 102 may comprise a governmental premises, such as a public service building and/or governmental office.

The user device 101 may be configured to communicate with a computing device 103. The computing device 103 may be located external to the premises 102. The computing device 103 may comprise a server, such as a server hosting a database, a server hosting a website, a certificate authority server, a server providing content, and/or a server providing a service. The user device 101 may be configured to act as a client to the computing device 103. The computing device 103 may comprise a user device. The computing device 103 may comprise a router.

The user device 101 may be configured to communicate with the computing device 103 via a network 104. The network 104 may comprise the Internet. The network 104 may comprise a wide area network (WAN). The network 104 may comprise an Internet Protocol (IP) network. The network 104 may comprise a broadband network. The network 104 may comprise a cellular network. The network 104 may comprise a 3G, 4G, LTE, or 5G network.

The user device 101 may be configured to communicate with the computing device 103 by sending data to and/or receiving data from the computing device 103. The user device 101 may be configured to communicate with the computing device 103 by sending data to and/or receiving data from a router. The router may be configured to send data received from the user device 101 to the computing device 103. The router may be configured to send data received from the computing device 103 to the user device 101.

Data may be sent and/or received in one or more chunks. The chunks may comprise one or more data packets. The data packets may be sent and/or received in streams. A data packet may comprise a portion of the data being communicated (e.g., a message). As a result of the data packets each only comprising a portion of the data being communicated, the data being communicated may not be determined from a single packet, such as if a single packet is intercepted by a device other than the user device 101 and/or the computing device 103, such as a monitoring device.

The data packets may comprise identifying information. The identifying information may comprise an address (e.g., a MAC address, IP address, URL, port number, etc.) of the user device 101, an address of the computing device 103, a geographic location of the user device 101, and/or a geographic location of the computing device 103. The identifying information may comprise an address of a router, such as a router at the premises 102. For example, if the user device 101 is configured to communicate via the router, the router may replace an address of the user device 101 in one or more packets with an address of the router.

The identifying information may be used to determine a source of the data packets (e.g., the user device 101 and/or a router used by the user device 101). The identifying information may be used to determine where to send a response to the data packets (e.g., the user device and/or a router used by the user device 101). The identifying information may be used to determine that the data packets sent from the user device 101 are associated. Based on determining the associated data packets, the data to be communicated (e.g., the message) may be determined. The data packets may comprise other data, such as a time that the packet was sent, a query parameter, a header, and/or a cookie.

At least a portion of one or more of the data packets may be encrypted. For example, the portion of the packet indicating the data to be communicated may be encrypted. The encryption of the portion of the data may prevent a monitoring device from determining the data. The user device 101 may encrypt the portion of the data using a key associated with the computing device 103, such as a public key associated with the computing device 103. The key may be received from the computing device 103, such as in a session initiation and/or handshake between the user device 101 and the computing device 103. The portion of the data may be encrypted such that the portion may be decrypted using a key associated with the computing device 103, such as a private key associated with the computing device 103 and/or a key that is the corresponding pair to the key used to encrypt the portion of the data. The computing device 103 may have the key configured to decrypt the portion of the data.

A portion of the data packet may not be encrypted. For example, one or more pieces of identifying information in a packet may not be encrypted. The address of the computing device 103 indicated in a packet may not be encrypted, for example, in order to route the packet to the computing device 103.

A portion of the data packet may not be encrypted based on a communication protocol used. The communication protocol may comprise hypertext transfer protocol secure (HTTPS), as an example. The communication protocol may rely on unencrypted data for routing data packets. For example, an address of the destination device may not be encrypted in a data packet to route the data packet. The destination address may not raise privacy concerns, such as compared to a source address. Therefore, the source address may be encrypted and the destination address may be unencrypted to facilitate routing of the data packets to the destination device. Therefore, data packets sent using the communication protocol may have one or more unencrypted portions.

Communications from and/or to the user device 101 may be tracked. For example, the communications may be tracked by a monitoring device. The monitoring device may comprise a device other than the computing device 103. The monitoring device may be configured to intercept one or more data packets sent by and/or to the user device 101. If the one or more data packets comprise an address of the user device 101 and/or if the address is unencrypted, data packets may be determined to be associated with the user device, such as by the monitoring device. If user devices 101 at the premises 102 are configured to communicate via a router, the monitoring device may be configured to determine that packets sent by the user devices 101 are associated with a common premises and/or group of devices, such as based on the packets sent by the user devices 101 indicating the address of the same router.

The computing device 103 may be configured to track communications from and/or to the user device 101. The computing device 103 may be configured to track the communications from the user device 101 to the computing device 103 and/or particular information in the communications (e.g., data associated with a user of the user device 101). The computing device 103 may be configured to store the information. An entity associated with the computing device 103, such as a company and/or an organization, may sell the information and/or may use the information, such as for advertising, marketing, and/or other purposes.

The user device 101 may be configured to communicate with the computing device 103 using an anonymity network, such as an onion router (TOR). The anonymity network may comprise software on the user device 101. The anonymity network may be configured to determine a virtual circuit. The virtual circuit may comprise a plurality of computing devices. The virtual circuit may comprise a sequence of the plurality of computing devices by which a data packet from the user device 101 may be sent. The computing devices may comprise other user devices. The computing devices may comprise other devices that are running anonymity networks. The computing devices and/or their sequence may be randomly determined.

The anonymity network may be configured to encrypt a data packet from the user device 101 in one or more layers of encryption. The anonymity network may be configured to add an address associated with a computing device in the virtual circuit in layers of encryption. A layer of encryption may comprise an encryption of the data packet corresponding to a computing device in the virtual circuit. For example, a layer of encryption may comprise an encryption of the packet with a key associated with a computing device in the virtual circuit. An order of the layers of encryption may be associated with the sequence in which the data packet will be sent to the computing devices in the virtual circuit. For example, an outermost layer may be associated with a first computing device in the sequence. As a result, the outermost layer may be decrypted by the first computing device, which may reveal a next layer of encryption. Decryption of the outermost layer may reveal an address of a next computing device in the virtual circuit. The first computing device in the virtual circuit may be configured to send the data packet to the next computing device in the virtual circuit based on the address.

The first computing device in the virtual circuit may be configured to receive the data packet from the user device 101 via a communication session with the user device 101.

The first computing device may be configured to send the data packet to the second computing device in the virtual circuit via a communication session with the second computing device. Each computing device in the virtual circuit may be configured to receive the data packet via a communication session with the previous and/or the next computing device in the sequence. The last computing device in the virtual circuit may be configured to send the data packet to the destination, such as the computing device 103, via a communication session with the destination device. The communication session may comprise a secure communication session. The communication session may comprise an encrypted communication session. The communication session may comprise end-to-end encryption, such as a Secure Sockets Layer (SSL) or Transport Layer Security (TLS) communication session.

Based on receiving the data packet, computing devices in the virtual circuit may be configured to decrypt a layer, revealing an address of a next computing device in the virtual circuit. Each computing device in the virtual circuit may be configured to determine from which device the computing device received the data packet and to which device the computing device is sending the data packet (e.g., the previous device in the sequence and the next device in the sequence). However, a computing device in the virtual circuit may not be capable of determining from which device the data packet originated. For example, one or more computing devices in the virtual circuit may not be able to determine that the data packet was originally sent by the user device 101.

An inner layer may be associated with a last computing device in the virtual circuit. Decryption of the innermost layer may reveal an address associated with a destination of the data packet, such as the computing device 103. The last computing device in the virtual circuit may be configured to send the data packet to the computing device 103 based on the address.

An innermost layer may be associated with the destination of the data packet, such as the computing device 103. The computing device 103 may decrypt the final layer. Decryption of the final layer may reveal contents of the data packet, such as the data communicated by the user device 101 to the computing device 103 (e.g, the message).

Computing devices in the virtual circuit may not be able to determine the destination of the data packet. The computing devices may be configured to determine to which device to send the data packet. However, addresses of later computing devices in the sequence, including that of the destination device, may be encrypted and unobservable. Although the last computing device in the sequence of the virtual circuit may be configured to determine the address of the destination device, such as the address of computing device 103, the computing device may not be able to distinguish the destination device from another node in the virtual circuit.

The computing device 103 may be configured to send one or more data packets. For example, the computing device 103 may be configured to send a data packet in response to the one or more data packets received from the user device 101 via the virtual network. The computing device 103 may not be configured to determine the address of the user device 101 based on the received data packets not comprising an indication of the address of the user device 101. However, the computing device 103 may be configured to determine the device from which the computing device 103 received the data packets (e.g., the last computing device in the virtual network). Based on the address of the last computing device in the virtual network in the received data packets, the computing device 103 may be configured to send the data packets to the last computing device in the virtual network. The last computing device in the virtual network may be configured to relay the data packets from the computing device 103 to the previous computing device in the virtual network sequence. Each computing device in the virtual network may be configured to relay the data packets to the previous computing device in the virtual network sequence. The data packets may be routed through the virtual network in a reverse order of the sequence by which the data packets from the user device were sent to the computing device 103. Based on receiving the data packets, the first computing device in the virtual network sequence may be configured to send the data packets to the user device 101.

Use of the anonymity network may prevent a monitoring device from determining from which device the data packet originated. However, even with the use of TOR, the monitoring device may be configured to determine information associated with the behavior, network traffic, and/or activity of the user device 101. For example, the monitoring device may be configured to determine that communications with the computing device 103 occurred. If the computing device 103 hosts a website, provides content, and/or provides a service, the monitoring device may be configured to determine that the website was accessed, the content was accessed, and/or the service was utilized. The monitoring device may be configured to determine a duration of time and/or period of time that the website was accessed, the content was accessed, and/or the service was used. The monitoring device may be configured to determine a duration of time and/or period of time of a communication session with the computing device. The monitoring device may be configured to determine that an anonymity network was used. The monitoring device may be configured to determine an amount of data that was transferred to and/or from the computing device 103.

Vulnerabilities of an anonymity network and/or encryption may be addressed by using a privacy gateway 105. The privacy gateway 105 may comprise a computing device or a plurality of computing devices. The privacy gateway 105 may comprise a software application on a computing device. The software application may operate at a mid-point between communications of a client and a server. The privacy gateway may comprise a network appliance, a network switch or router, a virtual machine deployed in a private or public cloud, a serverless workload deployed in a private or public cloud, an application operating on a computer server, and/or an application operating on a host computer, as examples. The privacy gateway 105 may be configured to communicate with the user devices 101 and/or the computing device 103. The privacy gateway 105 may be configured to communicate with user devices 101 located at a plurality of premises 102. The plurality of premises 102 may be in different locations, such as different cities, counties, states, and/or countries. One or more of the premises 102 may be in a same location. The privacy gateway 105 may be located external to the premises 102. The privacy gateway 105 may be located in a public location, such as a server farm and/or a service provider facility.

The privacy gateway 105 may comprise a networking device 106. The networking device 106 may comprise a VPN concentrator. The networking device 106 may comprise a software application. The networking device 106 may comprise a gateway endpoint for an end of an encrypted VPN tunnel. The networking device 106 may use hardware devices to perform encryption computation tasks. The networking device 106 may be implemented as a server, a network appliance, a firewall appliance, a router, and/or another network component.

The networking device 106 may be configured to communicate with the user devices 101 and/or the computing device 103 via the network 104. The networking device 106 may comprise a firewall 110. The firewall 110 may be configured to block data from devices other than the user device 101, such as untrusted devices.

The networking device 106 may be configured to communicate with the user device 101 via a communication session 107. The networking device 106 may comprise a VPN client 111 configured to initiate and/or setup the communication session 107. The VPN client 111 may comprise an IPsec VPN client, such as a strongSwan VPN client.

The communication session 107 may comprise a client-side connection in which the privacy gateway 105 acts as a server and the user device 101 acts as a client to the server. The communication session 107 may comprise a virtual private network (VPN) tunnel. The networking device 106 may comprise an exit node of the VPN tunnel. The communication session 107 may comprise an Internet Protocol Security (IPsec)-encrypted VPN tunnel. The communication session 107 may comprise a Layer 2 Tunneling Protocol (L2TP). The communication session 107 may comprise a Point to Point Tunneling Protocol (PPTP) VPN tunnel. The communication session may comprise an OpenVPN tunnel. The communication session 107 may comprise malware filtering functionality. The communication session 107 may comprise Flash and/or Javascript blocking functionality. The networking device 106 may be configured to communicate with a plurality of user devices 101 via a plurality of communication sessions 107. The plurality of communication sessions 107 may use a same endpoint address to connect to the networking device 106.

The communication session 107 may be established based on an initiation and/or setup, such as by the user device 101 and/or the networking device 106. The initiation and/or setup may be defined by a central access policy. The central access policy may comprise a function of the networking device 106 that provides user-access-control into the networking device 106. Users may have login credentials for connecting to the networking device 106 and the central access policy may validate the credentials for access. For example, the central access policy may indicate an authentication method that must take place to establish the communication session 107. The initiation and/or setup may comprise performing a handshake. The initiation and/or setup may comprise exchange of authentication items, such as digital certificates. An authentication item associated with the user device 101 may be created based an account associated with the user device. For example, an account may be created. An account profile may be created. The account and/or the profile may be created by a user using the user device 101. The account and/or the profile may be associated with a service associated with the system 100. The service may comprise a communication service and/or a content service, as examples. Based on generation of the account and/or the profile, the user device 101 may be configured to send a request for the authentication item. The user device 101 may be configured to send the request for the authentication item to a computing device associated with the service and/or the system 100. Based on the request, the user device 101 may receive the authentication item. The user device 101 may be configured to store the authentication item on the user device 101.

The user device 101 may be configured to send the networking device 106 the authentication item associated with the user device 101. The networking device 106 may be configured to send the user device 101 an authentication item associated with the privacy gateway 105 and/or the networking device 106. The authentication item may be stored to the privacy gateway 105 and/or the networking device 106.

The user device 101 and/or the networking device 106 may be configured to authenticate each other based on the received authentication items. For example, the user device 101 and/or the networking device 106 may be configured to determine that the authentication item is signed by a trusted third-party device, such as a certificate authority (CA). The user device 101 and/or the networking device 106 may be configured to send the authentication item to the trusted third-party device, such as the CA. The user device 101 and/or the networking device 106 may be configured to receive a response from the trusted third-party device indicating that the authentication item is associated with a trusted device. A trusted device may comprise a device that is known to be associated with a user, a service provider, and/or a manufacturer. A trusted device may comprise a device that has previously identified itself, such as by sending an authentication item, an indication of an associated user, an indication of a service provider, and/or an indication of a manufacturer. A trusted device may comprise a device that runs security software.

The user device 101 and/or the networking device 106 may be configured to authenticate the other device based on validating the authentication item. Validating the authentication item may comprise comparing the authentication item to a known and/or saved authentication item. For example, one or more of the devices may be configured to determine that that the authentication item matches a previously-received authentication item. The previously-received authentication item and/or an indication of the previously-received authentication item may be stored to the device.

The user device 101 and/or the networking device 106 may be configured to exchange keys. The user device 101 and/or the networking device 106 may be configured to exchange keys based on authentication. The keys may be configured to encrypt data, such as data to be sent via the communication session 107. The keys may be configured to decrypt data, such as data sent via the communication session 107. The user device 101 may encrypt one or more data packets, such as using the key received from the networking device 106. The user device 101 may send the encrypted data packets to the networking device 106. The user device 101 may send the encrypted data packets to the networking device 106 using the communication session 107. Based on the encryption of the data packets, a monitoring device may not be able to determine the contents of the data packets.

The networking device 106 may be configured to receive one or more data packets, such as data packets from the user devices 101. The networking device 106 may be configured to receive the data packets, such as via the communication session 107. The data packets may be sent using a secure communication protocol, such as HTTPS, HTTP, TCP, UDP, and/or TLS. The networking device 106 may be configured to decrypt a data packet.

The networking device 106 may be configured to determine a destination of the decrypted data packet, such as the computing device 103, based on an address indicated in the data packet. Based on determining that the destination of the data packet is the computing device 103, the networking device 106 may be configured to initiate a communication session 108 with the computing device 103. Initiating the communication session 108 may comprise performing a handshake with the computing device 103. Initiating the communication session 108 may comprise sending a request to the computing device 103. Based on the request, the computing device 103 may be configured to send an authentication item, such as a digital certificate, to the networking device 106. The networking device 106 may be configured to send an authentication item to the computing device 103. The networking device 106 may be configured to send an authentication item associated with the user device 101, such as the digital certificate of the user device 101, to the computing device 103. The computing device 103 may send the authentication item back to the networking device 106 with a signature of the computing device 103. The networking device 106 may be configured to send the authentication item back to the user device 101. The networking device 106 may be configured to send the signed authentication item to the user device 101. The networking device 106 may be configured to send the authentication item to the system, such as to the privacy concentrator 109. The privacy concentrator 109 may comprise an anonymizer 115. The anonymizer 115 may comprise a TLS proxy. The anonymizer 115 may comprise an enforced private browsing proxy. The anonymizer 115 may comprise an HTTP anonymizer. The anonymizer 115 may comprise a man-in-the-middle. The anonymizer 115 may be configured to set up parallel communication sessions, such as the communication session 107 with the user device 101 and a communication session 117 with the computing device 103. The anonymizer 215 may be configured to aggregate devices on a public IP (Pub IP). The anonymizer 215 may be configured to aggregate the user devices 101. The anonymizer 215 may be configured to aggregate the devices on a public IP in the CG NAT 116 where traffic from the devices may be made to appear to come from a fewer number of IP addresses. The networking device 106 may be configured to send the authentication item to the anonymizer 115. The anonymizer 115 may be configured to sign the certificate. The anonymizer may be configured to send the signed certificate to the user device 101.

The networking device 106 may be configured to receive an authentication item associated with the computing device 103, such as from the computing device 103. The computing device 103 may be configured to send the authentication item associated with the computing device 103 based on receiving the authentication item associated with the user device 101. The networking device 106 may be configured to send the authentication item associated with the computing device 103 to the user device 101.

The networking device 106 and/or the computing device 103 may be configured to authenticate each other. For example, the networking device 106 and/or the computing device 103 may be configured to authenticate each other by validating the exchanged authentication items. Based on authenticating one another, the networking device 106 and/or the computing device 103 may be configured to exchange keys. The keys may be configured to encrypt data to be sent via the communication session 108. The keys may be configured to decrypt data sent via the communication session 108.

The networking device 106 may be configured to act as a client device, such as to the computing device 103. The networking device 106 may be configured to act as an end device to the user device 101. The networking device 106 may be configured to act as a man-in-the-middle device, such as by establishing and/or maintaining parallel communication sessions with one or more user devices 101 and/or one or more computing devices 103. The parallel communication sessions may be at least partially contemporaneous.

The privacy gateway 105 may comprise a privacy concentrator 109. The privacy concentrator 109 may comprise a computing device distinct from the networking device 106. The privacy concentrator 109 and the networking device 106 may comprise components on a same device (e.g., the privacy gateway 105). The privacy concentrator 109 may comprise a transport layer security (TLS) proxy, a man-in-the-middle, and/or an S-cell proxy. The privacy concentrator 109 may be configured to receive data packages associated with the user device 101 from the networking device 106.

The networking device 106 may comprise a tunnel interface 112. The tunnel interface 112 may be configured to send the packages to the privacy concentrator 109. The privacy concentrator 109 may comprise a tunnel interface 113. The tunnel interface 113 of the privacy concentrator 109 may be configured to receive the packages from the tunnel interface 112 of the networking device. The tunnel interfaces 112, 113 may be configured to communicate via a communication session 114. The communication session 114 may comprise a tunnel. The communication session 114 may comprise a tunnel (e.g., an unencrypted tunnel). The communication session 114 may comprise a cleartext tunnel. Via the communication session 114, the networking device 106 may be configured to send data, such as packets, to the privacy concentrator 109 in cleartext and/or plaintext.

A tunnel (e.g., an unencrypted tunnel) between the user device 101 and the computing device 103 may be established. The user device may send traffic intended for the computing device 103 through the tunnel to the privacy gateway. The privacy gateway may be configured to perform an HTTPS man in the middle and/or a network address translation (NAT) using a tunnel (e.g., an encrypted tunnel). Addressing on tunnel headers may be in cleartext. But, traffic between user devices 101 and a computing device 103 may be encrypted over HTTPS and sent via the tunnel.

The anonymizer 115 may be configured to determine data associated with the user device 101, such as in a data packet received from the user device 101. The data associated with the user device 101 may comprise one or more pieces of information. The data associated with the user device 101 may comprise an address of the user device 101. The data associated with the user device 101 may comprise an address of a router used by the user device 101. The data associated with the user device 101 may comprise an indication of a geographic location of the user device 101. The data associated with the user device 101 may comprise a browser running on the user device 101. The data associated with the user device 101 may comprise a central processing unit (CPU) of the user device 101. The data associated with the user device 101 may comprise data associated with a user of the user device 101. Data associated with the user may comprise an account name of the user, an employer of the user, and/or a geographic location of the user. The data associated with the user device 101 may comprise data that is not encrypted in data packets according to a communication protocol, such as HTTPS. The data associated with the user device 101 may be in an HTTP header of the data packet.

The anonymizer 115 may be configured to remove the data associated with the user device 101 from the data packet. Removing the data associated with the user device 101 may comprise generating a new data packet that does not comprise the data associated with the user device 101.

For example, based on a TCP connection, the data packet may terminate when it is received by the privacy gateway 105. The anonymizer 115 may generate a new data packet without the data associated with the user device 101. Removing the data associated with the user device 101 may comprise stripping the data from the data packet received from the user device 101.

The anonymizer 115 may be configured to replace the data associated with the user device 101 in the data packet. For example, the anonymizer 115 may be configured to replace the data associated with the user device 101 in the data packet with data associated with the privacy gateway 105. The data associated with the privacy gateway 105 may comprise an address associated with the privacy gateway 105. Replacing the data associated with the user device 101 with the data associated with the privacy gateway 105 may comprise generating a new data packet comprising the data associated with the privacy gateway 105. Replacing the data associated with the user device 101 with the data associated with the privacy gateway 105 may comprise adding the data associated with the privacy gateway 105 to the data packet received from the user device 101.

The anonymizer 115 may be configured to re-encrypt at least a portion of the data packet. The anonymizer 115 may be configured to re-encrypt at least a portion of the data packet using a key associated with the computing device 103, such as the public key of the computing device 103. The anonymizer 115 may be configured to send the data packet to the computing device 103, such as via the communication session 108.

The privacy concentrator 109 may comprise a carrier-grade network address translator (CG NAT) 116. The CG NAT 116 may be configured to send the data packet to the computing device 103. The CG Nat 116 may be configured to send the data packet via a network 104 (e.g., the network 104 in FIG. 1). The CG Nat 116 may be configured to send the data packet via a communication session 117 with the computing device 103. The communication session 117 may comprise a server-side connection wherein the privacy gateway 105 and/or the privacy concentrator 109 functions as a client to the computing device 103. The privacy gateway 105 may be configured to maintain at least a portion of the communication session 107 with the user device 101 and at least a portion of the communication session 108 with the computing device 103 contemporaneously.

An tunnel (e.g., an encrypted tunnel) between the user device 101 and the computing device 103 may be established. The user device 101 may send traffic intended for the computing device 103 through the tunnel to the privacy concentrator 109. The privacy concentrator 109 may be configured to perform an HTTPS man in the middle and/or a network address translation (NAT) using an tunnel. For example, the privacy concentrator 109 may be configured to proxy the HTTPS connection inside the privacy concentrator 109 and/or the privacy gateway 102. The privacy concentrator 102 may be configured to change data inside the HTTPS connections. The changes may comprise removing identifying information in the packets, such as to prevent the computing device 103 from identifying the user device 101 from which the packets originate. Addressing on tunnel headers may be in cleartext. But, traffic between the user devices 101 and the computing device 103 may be encrypted over HTTPS and sent via the tunnel.

The privacy concentrator 109 may be configured to receive one or more data packets, such as from the computing device 103. The privacy concentrator 109 may be configured to determine that the data packets are for the user device 101. The privacy concentrator 109 may be configured to determine that the data packets are for the user device 101 by maintaining a session state of communications between a user device 101 and the server 103. The privacy concentrator 109 may be configured to remember which connection from the server 103 is associated with which user device 101. The privacy concentrator 109 may be configured to determine data in a data packet that is associated with the privacy gateway 105. The privacy concentrator 109 may be configured to remove the data associated with the privacy gateway 105 from the data packet. The privacy concentrator 109 may be configured to add data associated with the user device 101 to the data packet. The privacy concentrator 109 may be configured to encrypt at least a portion of the data packet. The portion may comprise a message and/or contents of the package. A portion left unencrypted may comprise data that is needed to route the packet to the user device 101, such as an address. The privacy concentrator 109 may be configured to send the data packet to the user device 101, such as via the communication session 107.

The privacy gateway 105 may be configured to end the communication session 107 with the user device 101 and/or the communication sessions 108, 117 with the computing device 103. The privacy gateway 105 may be configured to end one or more sessions 107, 108, 117 based on sending one or more data packets to the computing device 103. The privacy gateway 105 may be configured to end one or more sessions 107, 108, 117 based on sending one or more data packets to the user device 101. The privacy gateway 105 may be configured to end one or more sessions 107, 108, 117 based on receiving an indication from the user device 101 to end communication sessions.

One or more IP cookies may be deleted, such as based on ending one or more of the communication sessions 107, 108, 117. A cookie may comprise identifying information associated with the user device 101, the computing device 103, and/or a user of the user device 101. A cookie may comprise an indication of activity and/or communications during a communication session. The cookies may be stored to the user device 101. The user device 101 may be configured to delete the cookies. The privacy gateway 105 may cause the cookies to be deleted. Canvas fingerprinting and/or browser fingerprinting may be deleted, such as based on ending one or more of the communication sessions 107, 109.

A device monitoring traffic between the user device 101, the privacy gateway 105, and/or the computing device 103 may not be able to determine that the user device 101 is receiving data from the computing device 103. For example, the monitoring device may not be able to determine websites, content, and/or services accessed by the computing device 103. The monitoring device may not be able to determine a duration of time and/or period of time that the website was accessed, the content was accessed, and/or the service was used. The monitoring device may not be able to determine a duration of time and/or period of time of a communication session with the computing device. The monitoring device may not be able to determine an amount of data that was transferred to and/or from the computing device 103. The privacy gateway 105 may be configured to perform one or more operations configured to hide an identity of a user device 101. The operations may comprise deleting cookies, as an example.

A monitoring device may not determine device associations. A monitoring device may not determine device associations based on the privacy gateway 105 being located external to the premises and being in communication with a plurality of devices at a plurality of premises. For example, the monitoring device may not determine that a plurality of user devices 101 use a same router. The monitoring device may not determine that the plurality of user devices 101 are located a same premises. Based on the privacy gateway 105 being in communication with a plurality of clients through the same addressing, the monitoring device cannot determine a connection used by a user device 101.

Figure 2:
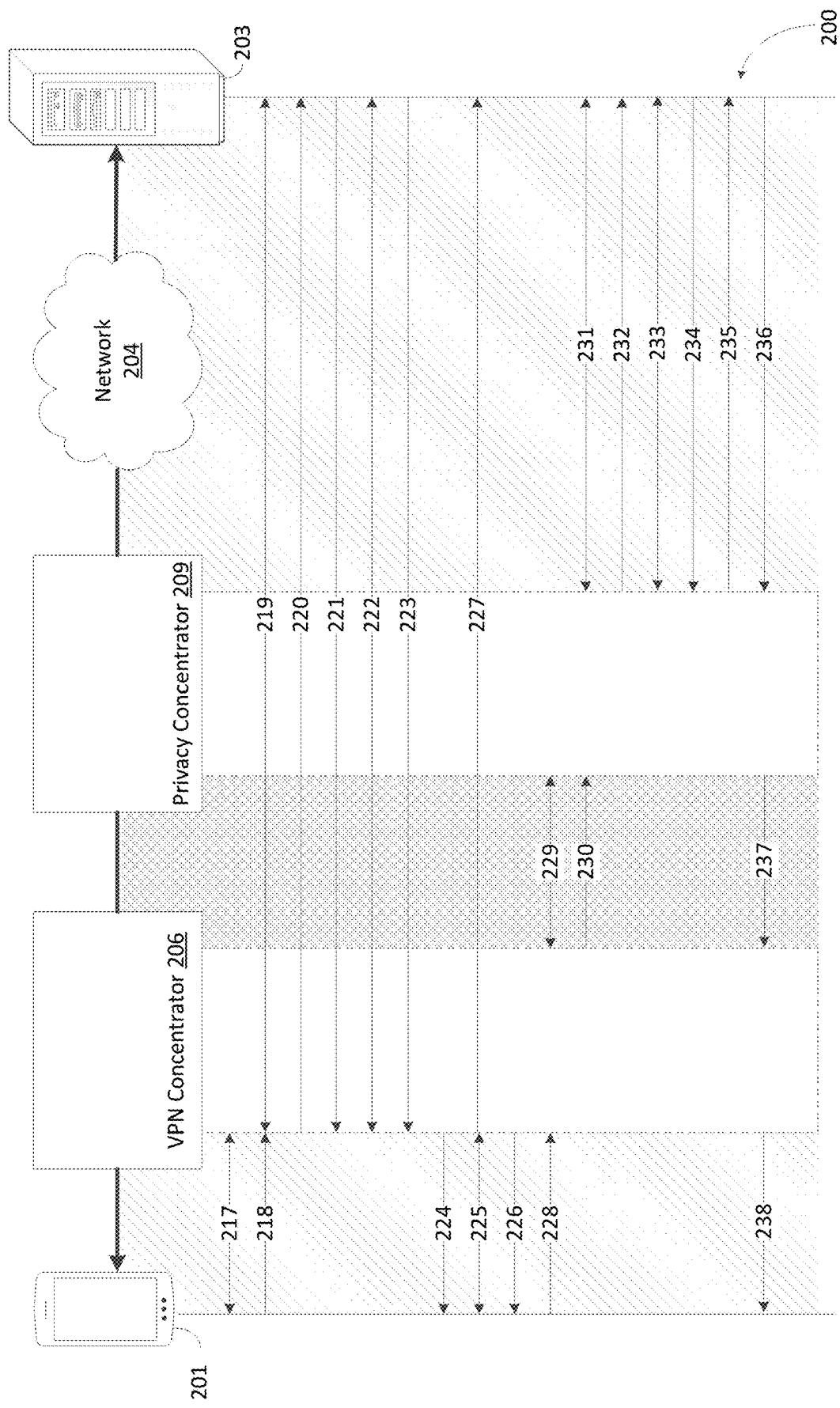
FIG. 2 shows an example method.

FIG. 2 shows an example method 200. The method 200 may be performed by a system, such as the system 100 in FIG. 1, or any other computing device. The system may comprise a user device 201 (e.g., the user device 101 in FIG. 1). The system may comprise a privacy gateway (e.g., the privacy gateway 105 in FIG. 1). The privacy gateway may comprise a networking device 206 (e.g., the networking device 106 in FIG. 1). The privacy gateway may comprise a privacy concentrator 209 (e.g., the privacy concentrator 109 in FIG. 1). The system may comprise a network 204 (e.g., the network 104 in FIG. 1). The system may comprise a computing device 203 (e.g., the computing device 103 in FIG. 1). The method 200 may comprise a method for the user device 201 to communicate with the computing device 203, such as via the privacy gateway.

At step 217, the user device 201 and the networking device 206 may perform a handshake. The handshake may comprise a TCP handshake. The handshake may be performed based on a user of the user device 201 navigating to a website over HTTPS. The handshake may be performed based on a browser on the user device 201 generating a query for the website's origin server, such as the computing device 203. The handshake may be performed based on the user device 201 requesting data, content, and/or a service from the computing device 203.

The handshake may comprise the user device 201 sending one or more packets. The user device 201 may send the packets to the networking device 206. A packet may comprise a TCP packet. The packet may comprise a SYN packet. The packet may comprise an IP packet. The packet may comprise an indication of a sequence number. The sequence number may be determined by the user device 201. The sequence number may be randomly determined. The packet may comprise an indication of one or more port numbers. The port numbers may comprise a source number, a client number, a destination number, and/or a server number. The port numbers may comprise a port number of the user device 201. The port numbers may comprise a port number of the networking device 206. The port numbers may comprise a port number of the computing device 203.

The handshake may comprise the networking device 206 sending one or more packets. The networking device 206 may send the one or more packets to the user device 201. The networking device 206 may send the one or more packets based on receiving one or more packets from the user device 201. A packet may comprise a TCP packet. The packet may comprise an IP packet. The packet may comprise a SYN ACK packet. The packet may comprise an indication that the networking device 206 received the one or more packets from the user device 201. The packet may comprise an indication of a sequence number. The sequence number may be determined by the networking device 206. The sequence number may be randomly determined. The packet may comprise an indication of one or more port numbers. The packet may comprise an indication of an acknowledgement number. The acknowledgement number may comprise the sequence number associated with the user device 201 plus one.

The handshake may comprise the user device 201 sending one or more packets. The client may send the one or more packets to the networking device 206. The client may send the one or more packets based on receiving the one or more packets from the networking device 206. A packet may comprise an indication that the user device 201 received the one or more packets from the networking device 206. The one or more packets may comprise an ACK packet. A packet may comprise an indication of the source and/or client port. The packet may comprise an indication of the destination and/or server port. The packet may comprise an indication of a new sequence number associated with the user device 201. The new sequence number may comprise the initial sequence number associated with the user device 201 plus one. The packet may comprise an indication of the acknowledgement number. The acknowledgement number may comprise the sequence number associated with the networking device plus one. Based on performing the handshake, a communication session may be established, such as a TCP session.

At step 218, the user device 201 may send the networking device 206 a message. The message may comprise an indication to initiate another handshake, such as a TLS and/or SSL handshake. The message may comprise a "Client Hello" message. The message may be sent based on performing the handshake in step 217. The message may be sent via the communication session established in step 217. The message may comprise a packet, such as a TCP packet. The message may comprise an indication of an encryption and/or communication protocol supported by the user device 201. The indication of the encryption and/or communication protocol may comprise an indication of a highest version of an encryption and/or communication protocol supported by the user device 201, such as a highest version of TLS protocol that the user device supports. The message may comprise an indication of a random number generated by the user device 201. The message may comprise an indication of one or more cipher suites supported by the user device 201. The cipher suits may comprise one or more cryptographic algorithms, such as a server authentication algorithm, a key exchange algorithm, a bulk encryption algorithm, and/or a message integrity algorithm. The message may comprise an indication of a compression algorithm supported by the user device 201. The message may comprise an indication of a session identifier. The session identifier may be used to resume an existing communication session instead of performing a handshake again. The networking device 206 may receive the message.

At step 219, the networking device 206 and the computing device may perform a handshake. The handshake may be performed via the network 204. The handshake may be performed based on performing the handshake in step 217 and/or receiving the message from the user device 201 in step 218. The handshake may comprise a TCP handshake.

The handshake may comprise the networking device 206 sending one or more packets. The networking device 206 may send one or more packets to the computing device 203. A packet may comprise a TCP packet. The packet may comprise a SYN packet. The packet may comprise an IP packet. The packet may comprise an indication of a sequence number. The sequence number may be determined by the networking device 206. The sequence number may be randomly determined. The packet may comprise an indication of one or more port numbers. The port numbers may comprise a source number, a client number, a destination number, and/or a server number. The port numbers may comprise a port number of the networking device 206. The port numbers may comprise a port number of the computing device 203.

The handshake may comprise the computing device 203 sending one or more packets. The computing device 203 may send the one or more packets to the networking device 206. The computing device 203 may send the one or more packets based on receiving one or more packets from the networking device 206. A packet may comprise a TCP packet. The packet may comprise an IP packet. The packet may comprise a SYN ACK packet. The packet may comprise an indication that the computing device 203 received the one or more packets from the networking device 206. The packet may comprise an indication of a sequence number. The sequence number may be determined by the computing device 203. The sequence number may be randomly determined. The packet may comprise an indication of one or more port numbers. The packet may comprise an indication of an acknowledgement number. The acknowledgement number may comprise the sequence number associated with the networking device 206 plus one.

The handshake may comprise the networking device 206 sending one or more packets. The client may send the one or more packets to the computing device 203. The networking device 206 may send the one or more packets based on receiving the one or more packets from the computing device 203. A packet may comprise an indication that the networking device 206 received the one or more packets from the computing device 203. The one or more packets may comprise an ACK packet. A packet may comprise an indication of the source and/or networking device 206 port. The packet may comprise an indication of the destination and/or computing device 203 port. The packet may comprise an indication of a new sequence number associated with the networking device 206. The new sequence number may comprise the initial sequence number associated with the networking device 206 plus one. The packet may comprise an indication of the acknowledgement number. The acknowledgement number may comprise the sequence number associated with the computing device 203 plus one. Based on performing the handshake, a communication session may be established.

At step 220, the networking device 206 may send the computing device 203 a message. The message may be sent via the network 204. The message may comprise an indication to initiate another handshake, such as a TLS and/or SSL handshake. The message may comprise a "Client Hello" message. The response may be sent based on performing the handshake in step 217. The response may be sent via the communication session established in step 219. The message may comprise a packet, such as a TCP packet. The message may comprise an indication of an encryption and/or communication protocol supported by the networking device 206. The indication of the encryption and/or communication protocol may comprise an indication of a highest version of an encryption and/or communication protocol supported by the networking device 206, such as a highest version of TLS protocol that the networking device 206 supports. The message may comprise an indication of a random number generated by the networking device 206. The message may comprise an indication of one or more cipher suites supported by the networking device 206. The cipher suits may comprise one or more cryptographic algorithms, such as a server authentication algorithm, a key exchange algorithm, a bulk encryption algorithm, and/or a message integrity algorithm. The message may comprise an indication of a compression algorithm supported by the networking device 206. The message may comprise an indication of a session identifier. The session identifier may be used to resume an existing communication session instead of performing a handshake again. The computing device 203 may receive the message.

At step 221, the networking device 206 may receive a message. The message may be sent by the computing device 203. The message may be sent via the network 204. The message may be sent via the communication session established in step 219. The message may comprise a "Server Hello" message. The message may be associated with initiation of a TLS and/or SSL handshake. The message may comprise a response to and/or an acknowledgement of receipt of the message sent and/or received in step 220. The message may be sent based on finishing the handshake in step 219.

At step 222, the networking device 206 and the computing device 203 may perform a handshake. The handshake may comprise a TLS and/or SSL handshake. The handshake may be performed based on the sending and/or receiving of the message from the computing device 203 in step 221. The handshake may be performed based on the sending and/or receiving of the message from the networking device 206 in step 220.

Performing the handshake may comprise sending one or more digital certificates. For example, the networking device 206 may receive a certificate from the computing device 203. The certificate of the computing device 203 may comprise an indication of a public key associated with the computing device 203. The certificate may be associated with a website associated with the computing device 203. Receiving the certificate may cause a TLS encrypted connections setup to be initiated.

Performing the handshake may comprise the networking device 206 validating the certificate. Validating the certificate may comprise determining that the certificate is signed by a CA. Validating the certificate may comprise determining that the certification authority is known and/or trusted. For example, the networking device 206 may have access and/or have stored a list of CA's that are trusted. The networking device 206 may determine that the CA that signed the certificate is on the list. The networking device 206 may validate the certificate by sending the certificate to an CA and receiving an indication from the CA that the computing device 203 is a trusted device.

Performing the handshake may comprise the networking device 206 receiving one or more messages from the computing device 203. The message may comprise a request for a certificate associated with the networking device 206. The request may comprise an indication of one or more certificate authorities trusted by the computing device 203. The request may comprise an indication of a type of the certificate. The message may comprise an indication that the computing device 203 is finished performing its steps of the handshake. For example, the message may comprise a "Server Hello Done" message. The networking device 206 may cache the certificate of the computing device 203, such as on a memory of the networking device 206. The networking device 206 may cache the public key of the computing device 203.

Performing the handshake may comprise the networking device 206 sending a digital certificate of the networking device 206 to the computing device 203. The networking device 206 may send the certificate to the computing device 203 based on receiving the request for the certificate from the computing device 203. The networking device 206 may send the certificate of the networking device 206 to a CA. The networking device 206 may send the certificate to a CA indicated in the request. If the certificate of the networking device 206 comprises a certificate of a certificate chain, the networking device 206 may send its public certificate and one or more other certificates in the chain to a root CA of the chain.

Performing the handshake may comprise the computing device 203 validating the certificate of the networking device 206. Validating the certificate may comprise determining that the certificate is signed by a known and/or trusted CA. The known and/or trusted CA may comprise a CA in the list sent to the networking device 206. If the certificate is of a certificate chain, validating the certificate may comprise determining that one or more certificates in the chain and signed by a known and/or trusted CA.

Performing the handshake may comprise the networking device 206 encrypting a premaster secret key. The networking device 206 may encrypt the premaster secret key based on validating the certificate of the computing device 203. The networking device 206 may use the public key from the certificate to encrypt a premaster secret key. The premaster key may comprise a shared secret between the networking device 206 and the computing device 203.

Performing the handshake may comprise the networking device 206 sending computing device 203 a message. The message may comprise a "Client Key Exchange" message. The message may comprise the encrypted premaster secret key to the computing device 203. The message may comprise an indication of an encryption and/or communication protocol. The encryption and/or communication protocol may be the same protocol indicated in the message sent by the networking device 206 in step 220.

Performing the handshake may comprise determining a master secret. The networking device 206 and/or the computing device 203 may determine the master secret. The master secret may be determined using the random number of the networking device 206, the random number of the computing device 203, and/or the premaster secret. The networking device 206 may send a message (e.g., a "Change Cipher Spec" message) to the computing device 203 indicating that subsequent messages should be protected with the exchanged keys. The networking device 206 may send the computing device 203 a message (e.g., a "Finished" message) indicating a hash of a message flow of the handshake. The hash may be encrypted using the exchanged keys.

The networking device 206 may receive a message from the computing device 203. The computing device 203 may send the message based on receiving one or more of the messages from the networking device 206. The message may comprise a "Change Cipher Spec" message. The message may indicate that the computing device 203 is ready to communicate using the exchanged keys. The message may comprise the hash of a message flow of the handshake. The hash may be encrypted with the exchanged keys.

At step 223, the handshake of step 224 may be finished. Based on completion of the handshake, there may be an encrypted channel (e.g., connection, communication session, etc.) between the networking device 206 and the computing device 203 (e.g., between the indicated ports of the devices). Based on completion of the handshake, the networking device 206 and the computing device 203 may communicate using the encrypted channel.

At step 224, the networking device 206 may send a message. The networking device 206 may send the message to the user device 201. The message may be sent via the communication session established in step 217. The message may comprise a "Server Hello" message. The message may be associated with initiation of a TLS and/or SSL handshake. The message may comprise a response to and/or an acknowledgement of receipt of the message sent and/or received in step 218. The message may be sent based on receiving the message in step 218. The message may be sent based on finishing the handshake in step 223.

At step 225, the user device 201 and the networking device 206 may perform a handshake. The handshake may comprise a TLS and/or SSL handshake. The handshake may be performed based on the sending and/or receiving of the message from the networking device 206 in step 224. The handshake may be performed based on the sending and/or receiving of the message from the user device 201 in step 218.

Performing the handshake may comprise sending one or more digital certificates. For example, the networking device may send the user device 201 a certificate of the privacy gateway and/or the networking device 206. The certificate of the privacy gateway and/or the networking device 206 may comprise an indication of a public key associated with the privacy gateway and/or the networking device 206. The networking device may send the user device 201 the certificate of the computing device 203 received in step 222.

Performing the handshake may comprise the user device 201 validating one or more of the certificates. Validating the certificate may comprise determining that the certificate is signed by a CA. Validating the certificate may comprise determining that the certification authority is known and/or trusted. For example, the user device 201 may have access and/or have stored a list of CA's that are trusted. The user device 201 may determine that the CA that signed the certificate is on the list.

Performing the handshake may comprise the networking device 206 sending one or more messages to the user device 201. The message may comprise a request for a certificate associated with the user device 201. The request may comprise an indication of one or more certificate authorities trusted by the server. The request may comprise an indication of a type of the certificate. The message may comprise an indication that the networking device 206 is finished performing its steps of the handshake. For example, the message may comprise a "Server Hello Done" message.

Performing the handshake may comprise the user device 201 sending a certificate of the user device 201 to the networking device 206. The user device 201 may send the certificate to the networking device 206 based on receiving the request for the certificate from the networking device 206. The user device 201 may send the certificate of the user device 201 to a CA. The user device 201 may send the certificate to a CA indicated in the request. If the certificate of the user device 201 comprises a certificate of a certificate chain, the user device 201 may send its public certificate and one or more other certificates in the chain to a root CA of the chain.

Performing the handshake may comprise the networking device validating the certificate of the user device 201. Validating the certificate may comprise determining that the certificate is signed by a known and/or trusted CA. The known and/or trusted CA may comprise a CA in the list sent to the user device 201. If the certificate is of a certificate chain, validating the certificate may comprise determining that one or more certificates in the chain and signed by a known and/or trusted CA.

Performing the handshake may comprise the user device 201 encrypting a premaster secret key. The user device 201 may encrypt the premaster secret key based on validating the certificate of the privacy gateway and/or the networking device 206. The user device 201 may use the public key from the certificate to encrypt a premaster secret key. The premaster key may comprise a shared secret between the user device 201 and the privacy gateway and/or the networking device 206.

Performing the handshake may comprise the user device 201 sending the networking device 206 a message. The message may comprise a "Client Key Exchange" message. The message may comprise the encrypted premaster secret key to the networking device 206. The message may comprise an indication of an encryption and/or communication protocol. The encryption and/or communication protocol may be the same protocol indicated in the message sent by the user device 201 in step 218.

Performing the handshake may comprise determining a master secret. The user device 201 and/or the networking device 206 may determine the master secret. The master secret may be determined using the random number of the user device 201, the random number of the networking device 208, and/or the premaster secret. The user device 201 may send a message (e.g., a "Change Cipher Spec" message) to the networking device 206 indicating that subsequent messages should be protected with the exchanged keys. The user device 201 may send the networking device a message (e.g., a "Finished" message) indicating a hash of a message flow of the handshake. The hash may be encrypted using the exchanged keys.

The networking device 206 may send the user device 201 a message based on receiving one or more of the messages from the user device 201. The message may comprise a "Change Cipher Spec" message. The message may indicate that the networking device 206 is ready to communicate using the exchanged keys. The message may comprise the hash of a message flow of the handshake. The hash may be encrypted with the exchanged keys.

At step 226, the handshake of step 225 may be finished. Based on completion of the handshake, there may be an encrypted channel (e.g., connection, communication session, etc.) between the user device 201 and the networking device 206 (e.g., between the indicated ports of the devices). Based on completion of the handshake, the user device 201 and the networking device 206 may communicate using the encrypted channel.

At step 227, the networking device 206 may reset the connection between the networking device 206 and the computing device 203. Resetting the connection may comprise ending the connection. The connection may be reset based on performing the handshake in step 225. The connection may be reset to force the connection between the networking device 206 and the server 203 to reconnect. The first connection between the networking device 206 and the server 203 may be used to pull the server certificates from the server 203. The server certificates pulled from the server 203 may be resigned back to the client. A second connection between the networking device 206 and the server 203 may be established to create a proxied connection. At least a portion of step 227 may be performed simultaneous with at least a portion of step 225.

At step 228, the user device 201 may send a request. The request may comprise a request associated with the computing device 203. For example, the request may comprise a request for data, a service, and/or content from the computing device 203. The request may comprise data for the computing device 203. The request may comprise a request to communicate with the computing device 203. The request may comprise an indication to relay the request to the computing device 203. The request may comprise a website request, such as an HTTP GET request. The request may comprise a request for website information.

The user device 201 may send the request to the networking device 206. The request may be sent based on performing the handshake in step 225. The request may be sent using the channel set-up by performing the handshake in step 225. The request may comprise one or more chunks of data. The chunks may comprise one or more data packets. The request may comprise a stream of data packets.

One or more of the data packets may comprise identifying information. The identifying information may comprise an address (e.g., a MAC address, IP address, URL, port number, etc.) of the user device 201, an address of the computing device 203, an address of the privacy gateway, an address of the networking device 206, and/or a geographic location of the user device 201. The identifying information may comprise an address of a router, such as a router at a premises where the user device 201 is located. The data packet may comprise other data, such as a time that the packet was sent, a query parameter, a header, and/or a cookie.

The one or more data packets may comprise one or more layers of encryption. For example, a data packet may be encrypted using the public key of the computing device 203 and/or the public key of the networking device. The user device 201 may encrypt a portion of the data packet using the public key of the computing device 203. The user device 201 may not encrypt a portion of the data packet needed to send the data packet to the networking device 206, such as an address of the networking device 206. The user device 201 may encrypt a portion the encrypted data packet using the public key of the networking device.

The networking device 206 may receive the request. The networking device 206 may decrypt one or more data packets of the request. The networking device 206 may decrypt a data packet using a private key of the networking device 206. A packet may comprise more than one layer of encryption. An outermost layer of encryption of the packet may comprise an encryption with the public key of the networking device 206. The networking device may decrypt the outermost layer of the packet.

Based on decrypting at least a portion of one or more data packets, the networking device may determine that the request was sent by the user device 201, such as based on the address of the user device. Based on decrypting at least a portion of the data packets, the networking device 206 may determine that the request is associated with the computing device 203, such as based on an address of the computing device 203.

At step 229, the networking device 206 and the privacy concentrator 209 may perform a handshake. The handshake may be performed based on the networking device 206 receiving the request in step 228. The handshake may comprise a TCP handshake.

The handshake may comprise the networking device 206 sending one or more packets. The networking device 206 may send one or more packets to the privacy concentrator 209. A packet may comprise a TCP packet. The packet may comprise a SYN packet. The packet may comprise an IP packet. The packet may comprise an indication of a sequence number. The sequence number may be determined by the networking device 206. The sequence number may be randomly determined. The packet may comprise an indication of one or more port numbers. The port numbers may comprise a source number, a client number, a destination number, and/or a server number. The port numbers may comprise a port number of the networking device 206. The port numbers may comprise a port number of the privacy concentrator 209.

The handshake may comprise the privacy concentrator 209 sending one or more packets. The privacy concentrator 209 may send the one or more packets to the networking device 206. The privacy concentrator 209 may send the one or more packets based on receiving one or more packets from the networking device 206. A packet may comprise a TCP packet. The packet may comprise an IP packet. The packet may comprise a SYN ACK packet. The packet may comprise an indication that the privacy concentrator 209 received the one or more packets from the networking device 206. The packet may comprise an indication of a sequence number. The sequence number may be determined by the privacy concentrator 209. The sequence number may be randomly determined. The packet may comprise an indication of one or more port numbers. The packet may comprise an indication of an acknowledgement number. The acknowledgement number may comprise the sequence number associated with the networking device 206 plus one.

The handshake may comprise the networking device 206 sending one or more packets. The client may send the one or more packets to the privacy concentrator 209. The networking device 206 may send the one or more packets based on receiving the one or more packets from the privacy concentrator 209. A packet may comprise an indication that the networking device 206 received the one or more packets from the privacy concentrator 209. The one or more packets may comprise an ACK packet. A packet may comprise an indication of the source and/or networking device 206 port. The packet may comprise an indication of the destination and/or privacy concentrator 209 port. The packet may comprise an indication of a new sequence number associated with the networking device 206. The new sequence number may comprise the initial sequence number associated with the networking device 206 plus one. The packet may comprise an indication of the acknowledgement number. The acknowledgement number may comprise the sequence number associated with the privacy concentrator 209 plus one. Based on performing the handshake, a communication session may be established.

At step 230, the networking device 206 may send a request. The networking device 206 may send the request to the privacy concentrator 209. The networking device 206 may send the request based on performing the handshake in step 229. The networking device 206 may send the request via the communication session established in step 229. The request may comprise an indication of the request sent by the user device 201 in step 228. The request may comprise one or more of the data packets sent by the user device 201 in step 228. The request may comprise one or more data packets received from the user device 201 that were decrypted or at least partially decrypted by the networking device.

The request may comprise a clear-text request. The clear-text request may be unencrypted. The clear-text request may comprise a portion that is unencrypted. The clear-text request may not have a layer of encryption. The clear-text request may comprise one or more data packets with one or more layers of encryption removed, such as by the networking device 206. The privacy concentrator 209 may receive the request.

At step 231, the privacy concentrator 209 and the computing device 203 may perform a handshake. The privacy concentrator 209 may perform the handshake based on receiving the request in step 230. The handshake may comprise a TCP handshake.

The handshake may comprise the privacy concentrator 209 sending one or more packets. The privacy concentrator 209 may send one or more packets to the computing device 203. A packet may comprise a TCP packet. The packet may comprise a SYN packet. The packet may comprise an IP packet. The packet may comprise an indication of a sequence number. The sequence number may be determined by the privacy concentrator 209. The sequence number may be randomly determined. The packet may comprise an indication of one or more port numbers. The port numbers may comprise a source number, a client number, a destination number, and/or a server number. The port numbers may comprise a port number of the privacy concentrator 209. The port numbers may comprise a port number of the computing device 203.

The handshake may comprise the computing device 203 sending one or more packets. The computing device 203 may send the one or more packets to the privacy concentrator 209. The computing device 203 may send the one or more packets based on receiving one or more packets from the privacy concentrator 209. A packet may comprise a TCP packet. The packet may comprise an IP packet. The packet may comprise a SYN ACK packet. The packet may comprise an indication that the computing device 203 received the one or more packets from the privacy concentrator 209. The packet may comprise an indication of a sequence number. The sequence number may be determined by the computing device 203. The sequence number may be randomly determined. The packet may comprise an indication of one or more port numbers. The packet may comprise an indication of an acknowledgement number. The acknowledgement number may comprise the sequence number associated with the privacy concentrator 209 plus one.

The handshake may comprise the privacy concentrator 209 sending one or more packets. The privacy concentrator 209 may send the one or more packets to the computing device 203. The privacy concentrator 209 may send the one or more packets based on receiving the one or more packets from the computing device 203. A packet may comprise an indication that the privacy concentrator 209 received the one or more packets from the computing device 203. The one or more packets may comprise an ACK packet. A packet may comprise an indication of the source and/or the privacy concentrator 209. The packet may comprise an indication of the destination and/or computing device 203 port. The packet may comprise an indication of a new sequence number associated with the privacy concentrator 209. The new sequence number may comprise the initial sequence number associated with the privacy concentrator 209 plus one. The packet may comprise an indication of the acknowledgement number. The acknowledgement number may comprise the sequence number associated with the computing device 203 plus one. Based on performing the handshake, a communication session may be established.

At step 232, the privacy concentrator 209 may send a message. The privacy concentrator 209 may send the message via the network 204. The privacy concentrator 209 may send the message to the computing device 203. The privacy concentrator 209 may send the message based on performing the handshake in step 231. The privacy concentrator 209 may send the message via the communication session established in step 231. The message may comprise an indication to initiate another handshake, such as a TLS and/or SSL handshake. The message may comprise a "Client Hello" message. The message may be sent based on performing the handshake in step 231. The computing device 203 may receive the response.

The message may comprise a packet, such as a TCP packet. The message may comprise an indication of an encryption and/or communication protocol supported by the privacy concentrator 209. The indication of the encryption and/or communication protocol may comprise an indication of a highest version of an encryption and/or communication protocol supported by the privacy concentrator 209, such as a highest version of TLS protocol that the privacy concentrator 209 supports. The message may comprise an indication of a random number generated by the privacy concentrator 209. The message may comprise an indication of one or more cipher suites supported by the privacy concentrator 209. The cipher suits may comprise one or more cryptographic algorithms, such as a server authentication algorithm, a key exchange algorithm, a bulk encryption algorithm, and/or a message integrity algorithm. The message may comprise an indication of a compression algorithm supported by the privacy concentrator 209. The message may comprise an indication of a session identifier. The session identifier may be used to resume an existing communication session instead of performing a handshake again. The computing device 203 may receive the message.

At step 233, a handshake may be performed between the privacy concentrator 209 and the computing device 203. The handshake may be performed based on receiving the request in step 230. The handshake may be performed based on sending and/or receiving the message in step 232. The handshake may be performed based on a TCP connection being opened, such as by performing the handshake in step 231. The handshake may comprise an SSL handshake.

Performing the handshake may comprise sending one or more digital certificates. For example, the privacy concentrator 209 may receive a certificate from the computing device 203. The certificate of the computing device 203 may comprise an indication of a public key associated with the computing device 203.

Performing the handshake may comprise the privacy concentrator 209 validating the certificate. Validating the certificate may comprise determining that the certificate is signed by a CA. Validating the certificate may comprise determining that the certification authority is known and/or trusted. For example, the privacy concentrator 209 may have access and/or have stored a list of CA's that are trusted. The privacy concentrator 209 may determine that the CA that signed the certificate is on the list.

Performing the handshake may comprise the privacy concentrator 209 receiving one or more messages from the computing device 203. The message may comprise a request for a certificate associated with the privacy concentrator 209. The request may comprise an indication of one or more certificate authorities trusted by the computing device 203. The request may comprise an indication of a type of the certificate. The message may comprise an indication that the computing device 203 is finished performing its steps of the handshake. For example, the message may comprise a "Server Hello Done" message.

Performing the handshake may comprise the privacy concentrator 209 sending a certificate of the privacy concentrator 209 to the computing device 203. The privacy concentrator 209 may send the certificate to the computing device 203 based on receiving the request for the certificate from the computing device 203 The networking device 206 may send the certificate of the privacy concentrator 209 to a CA. privacy concentrator 209 may send the certificate to a CA indicated in the request. If the certificate of the privacy concentrator 209 comprises a certificate of a certificate chain, the privacy concentrator 209 may send its public certificate and one or more other certificates in the chain to a root CA of the chain.

Performing the handshake may comprise the computing device 203 validating the certificate of the privacy concentrator 209. Validating the certificate may comprise determining that the certificate is signed by a known and/or trusted CA. The known and/or trusted CA may comprise a CA in the list sent to the privacy concentrator 209. If the certificate is of a certificate chain, validating the certificate may comprise determining that one or more certificates in the chain and signed by a known and/or trusted CA.

Performing the handshake may comprise the privacy concentrator 209 encrypting a premaster secret key. The privacy concentrator 209 may encrypt the premaster secret key based on validating the certificate of the computing device 203. The privacy concentrator 209 may use the public key from the certificate to encrypt a premaster secret key. The premaster key may comprise a shared secret between the privacy concentrator 209 and the computing device 203.

Performing the handshake may comprise the privacy concentrator 209 sending computing device 203 a message. The message may comprise a "Client Key Exchange" message. The message may comprise the encrypted premaster secret key to the computing device 203. The message may comprise an indication of an encryption and/or communication protocol. The encryption and/or communication protocol may be the same protocol indicated in the message sent by the privacy concentrator 209 in step 220.

Performing the handshake may comprise determining a master secret. The privacy concentrator 209 and/or the computing device 203 may determine the master secret. The master secret may be determined using the random number of the privacy concentrator 209, the random number of the computing device 203, and/or the premaster secret. The privacy concentrator 209 may send a message (e.g., a "Change Cipher Spec" message) to the computing device 203 indicating that subsequent messages should be protected with the exchanged keys. The privacy concentrator 209 may send the computing device 203 a message (e.g., a "Finished" message) indicating a hash of a message flow of the handshake. The hash may be encrypted using the exchanged keys.

The privacy concentrator 209 may receive a message from the computing device 203. The computing device 203 may send the message based on receiving one or more of the messages from the privacy concentrator 209. The message may comprise a "Change Cipher Spec" message. The message may indicate that the computing device 203 is ready to communicate using the exchanged keys. The message may comprise the hash of a message flow of the handshake. The hash may be encrypted with the exchanged keys.

At step 235, the privacy concentrator 209 may send a request. The privacy concentrator 209 may send the request to the computing device 203. The request may comprise one or more of the data packets from the user device 201 received from the networking device 206 in step 230. The privacy concentrator 209 may encrypt one or more of the data packets, such as using the public key of the computing device 203. The privacy concentrator 209 may encrypt a portion of a data packet. For example, the privacy concentrator 209 may not encrypt a portion of the data packet for routing the data packet to the computing device 203, such as an address of the computing device 203. The computing device 203 may receive the request.

At step 236, the privacy concentrator 209 may receive a response. The response may comprise a response to the request send and/or received in step 235. The response may be encrypted. For example, the response may be encrypted using a public key of the privacy concentrator 209. The privacy concentrator 209 may decrypt at least a portion of the response, such as using a private key of the privacy concentrator 209.

At step 237, the privacy concentrator 209 may send a response. The privacy concentrator 209 may send the response to the networking device 206. The response may be sent via the communication channel established in step 229. The response may comprise an indication of the response received in step 236. The response may comprise a clear-text response. The clear-text response may comprise the decrypted response received from the computing device 203. The networking device 206 may receive the response.

At step 238, the networking device 206 may send a response. The networking device 206 may send the response to the user device 201. The response may be sent using the channel set-up by performing the handshake in step 225. The response may comprise an indication of the response received in step 237. The response may comprise a response from the website. The response may comprise website data, such as hypertext markup language (HTML), images, and/or other data. The networking device 206 may encrypt the response received in step 237, such as using a public key of the user device 201. The networking device 206 may send the encrypted response to the user device 201. The user device 201 may receive the response.

Figure 3:
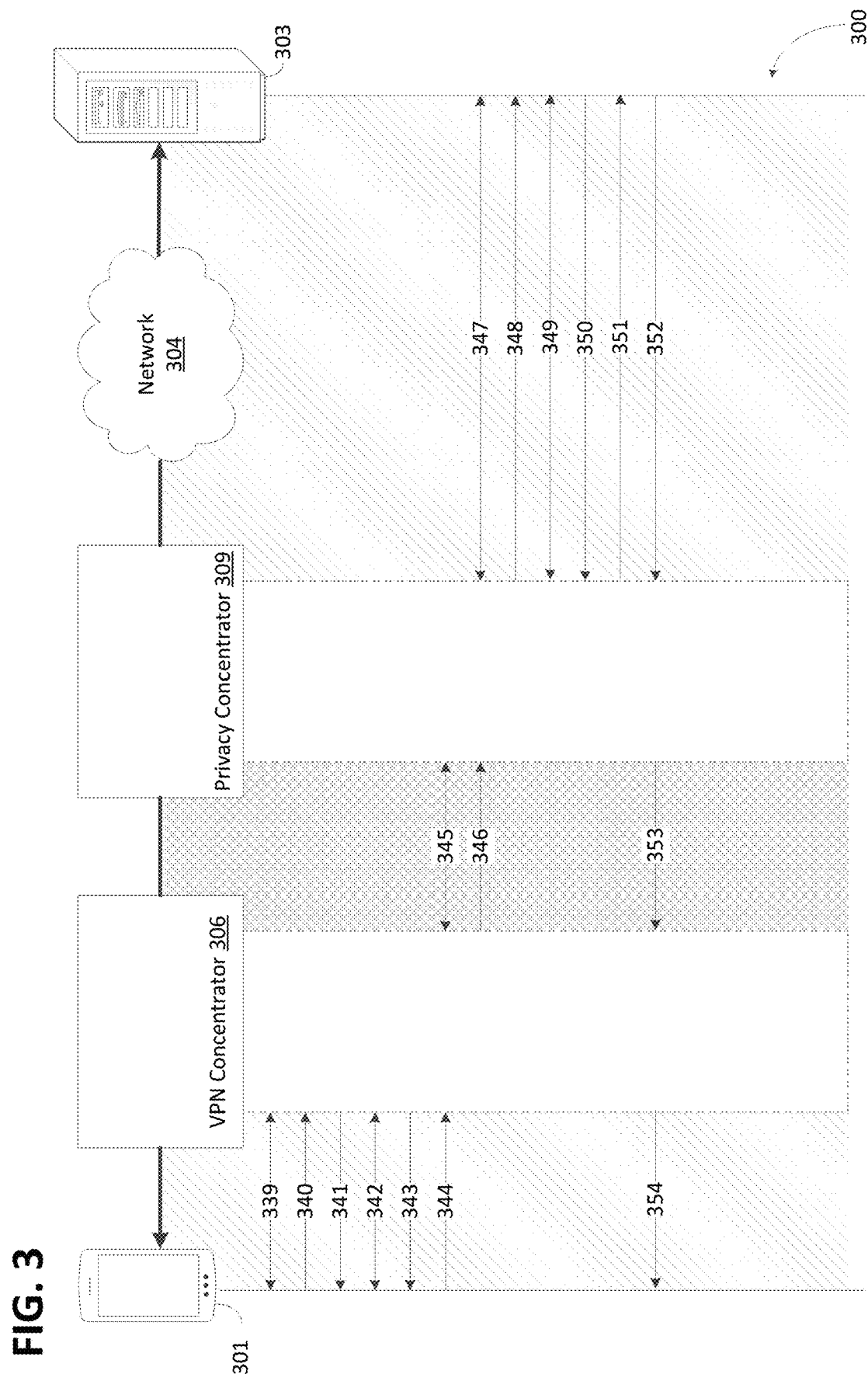
FIG. 3 shows an example method.

FIG. 3 shows an example method 300. The method 300 may comprise a method of communicating with one or more devices. The channels may be used to perform secure communications, such as using the method in FIG. 4. The method 300 may be similar to the method 200 in FIG. 2. As compared to the method 200 in FIG. 2, the method 300 may insert the privacy functions in the networking device system. The networking device may establish a cleartext window in the encrypted path to the website and the privacy gateway may remove identifiable information from the website.

The method 300 may be performed by a system, such as the system 100 in FIG. 1 and/or the system in FIG. 2, or any other computing device. The system may comprise a user device 301 (e.g., the user device 101 in FIG. 1 and/or the user device 201 in FIG. 2). The system may comprise a privacy gateway (e.g., the privacy gateway 105 in FIG. 1). The privacy gateway may comprise a networking device 306 (e.g., the networking device 106 in FIG. 1 and/or the networking device 206 in FIG. 2). The privacy gateway may comprise a privacy concentrator 309 (e.g., the privacy concentrator 109 in FIG. 1 and/or the privacy concentrator 209 in FIG. 2). The system may comprise a network 304 (e.g., the network 104 in FIG. 1 and/or the network 204 in FIG. 2). The system may comprise a computing device 303 (e.g., the computing device 103 in FIG. 1 and/or the computing device 203 in FIG. 2). The method 300 may comprise a method for the user device 301 to communicate with the computing device 303, such as via the privacy gateway. The method 300 may comprise the privacy gateway relaying communications to and/or from the user device 301 and to and/or from the network 304 and/or the computing device 303. The method 300 may comprise the privacy gateway acting as a proxy for the user device 301 in communicating with the network 304 and/or the computing device 303.

At step 339, the user device 301 and the networking device 306 may perform a handshake. The handshake may comprise a TCP handshake. The handshake may be performed based on a user of the user device 301 navigating to a website over HTTPS. The handshake may be performed based on a browser on the user device 301 generating a query for the website's origin server, such as the computing device 303.

The handshake may comprise the user device 301 sending one or more packets. The user device 301 may send one or more packets to the networking device 306. A packet may comprise a TCP packet. The packet may comprise a SYN packet. The packet may comprise an IP packet. The packet may comprise an indication of a sequence number. The sequence number may be determined by the user device 301. The sequence number may be randomly determined. The packet may comprise an indication of one or more port numbers. The port numbers may comprise a source number, a client number, a destination number, and/or a server number. The port numbers may comprise a port number of the user device 301. The port numbers may comprise a port number of the networking device 306. The port numbers may comprise a port number of the computing device 303.

The handshake may comprise the networking device 306 sending one or more packets. The networking device 306 may send the one or more packets to the user device 301. The networking device 306 may send the one or more packets based on receiving one or more packets from the user device 301. A packet may comprise a TCP packet. The packet may comprise an IP packet. The packet may comprise a SYN ACK packet. The packet may comprise an indication that the networking device 306 received the one or more packets from the user device 301. The packet may comprise an indication of a sequence number. The sequence number may be determined by the networking device 306. The sequence number may be randomly determined. The packet may comprise an indication of one or more port numbers. The packet may comprise an indication of an acknowledgement number. The acknowledgement number may comprise the sequence number associated with the user device 301 plus one.

The handshake may comprise the user device 301 sending one or more packets. The client may send the one or more packets to the networking device 306. The client may send the one or more packets based on receiving the one or more packets from the networking device 306. A packet may comprise an indication that the user device 301 received the one or more packets from the networking device 306. The one or more packets may comprise an ACK packet. A packet may comprise an indication of the source and/or client port. The packet may comprise an indication of the destination and/or server port. The packet may comprise an indication of a new sequence number associated with the user device 301. The new sequence number may comprise the initial sequence number associated with the user device 301 plus one. The packet may comprise an indication of the acknowledgement number. The acknowledgement number may comprise the sequence number associated with the networking device plus one. Based on performing the handshake, a communication session may be established.

At step 340, the user device 301 may send a message. The user device 301 may send the networking device 306 the message. The user device 301 may send the message based on performing the handshake in step 339. The user device 301 may send the message via the communication session established in step 339. The message may comprise an indication to initiate another handshake, such as a TLS and/or SSL handshake. The message may comprise a "Client Hello" message. The response may be sent based on performing the handshake in step 317. The message may comprise a packet, such as a TCP packet. The message may comprise an indication of an encryption and/or communication protocol supported by the user device 301. The indication of the encryption and/or communication protocol may comprise an indication of a highest version of an encryption and/or communication protocol supported by the user device 301, such as a highest version of TLS protocol that the user device supports. The message may comprise an indication of a random number generated by the user device 301. The message may comprise an indication of one or more cipher suites supported by the user device 301. The cipher suites may comprise one or more cryptographic algorithms, such as a server authentication algorithm, a key exchange algorithm, a bulk encryption algorithm, and/or a message integrity algorithm. The message may comprise an indication of a compression algorithm supported by the user device 301. The message may comprise an indication of a session identifier. The session identifier may be used to resume an existing communication session instead of performing a handshake again. The networking device 306 may receive the message.

At step 341, the networking device 306 may send a message. The networking device 306 may send the message to the user device 301. The message may comprise a "Server Hello" message. The message may be associated with initiation of a TLS and/or SSL handshake. The message may comprise a response to and/or an acknowledgement of receipt of the message sent and/or received in step 340.

At step 342, the user device 301 and the networking device 306 may perform a handshake. The handshake may comprise a TLS and/or SSL handshake. The handshake may be performed based on the sending and/or receiving of the message from the networking device 306 in step 341. The handshake may be performed based on the sending and/or receiving of the message from the user device 301 in step 340.

Performing the handshake may comprise sending one or more digital certificates. For example, the networking device 306 may send the user device 301 a certificate of the privacy gateway and/or the networking device 306. The certificate of the privacy gateway and/or the networking device 306 may comprise an indication of a public key associated with the privacy gateway and/or the networking device 306. The networking device 306 may send the user device 301 the certificate of the computing device 303 (e.g., the certificate received in method 200 in FIG. 2).

Performing the handshake may comprise the user device 301 validating one or more of the certificates. Validating the certificate may comprise determining that the certificate is signed by a CA. Validating the certificate may comprise determining that the certification authority is known and/or trusted. For example, the user device 301 may have access and/or have stored a list of CA's that are trusted. The user device 301 may determine that the CA that signed the certificate is on the list.

Performing the handshake may comprise the networking device 306 sending one or more messages to the user device 301. The message may comprise a request for a certificate associated with the user device 301. The request may comprise an indication of one or more certificate authorities trusted by the server. The request may comprise an indication of a type of the certificate. The message may comprise an indication that the networking device 306 is finished performing its steps of the handshake. For example, the message may comprise a "Server Hello Done" message.

Performing the handshake may comprise the user device 301 sending a certificate of the user device 301 to the networking device 306. The user device 301 may send the certificate to the networking device 306 based on receiving the request for the certificate from the networking device 306. The user device 301 may send the certificate of the user device 301 to a CA. The user device 301 may send the certificate to a CA indicated in the request. If the certificate of the user device 301 comprises a certificate of a certificate chain, the user device 301 may send its public certificate and one or more other certificates in the chain to a root CA of the chain.

Performing the handshake may comprise the networking device validating the certificate of the user device 301. Validating the certificate may comprise determining that the certificate is signed by a known and/or trusted CA. The known and/or trusted CA may comprise a CA in the list sent to the networking device 306. If the certificate is of a certificate chain, validating the certificate may comprise determining that one or more certificates in the chain and signed by a known and/or trusted CA.

Performing the handshake may comprise the user device 301 encrypting a premaster secret key. The user device 301 may encrypt the premaster secret key based on validating the certificate of the privacy gateway and/or the networking device 306. The user device 301 may use the public key from the certificate to encrypt a premaster secret key. The premaster key may comprise a shared secret between the user device 301 and the privacy gateway and/or the networking device 306.

Performing the handshake may comprise the user device 301 sending the networking device 306 a message. The message may comprise a "Client Key Exchange" message. The message may comprise the encrypted premaster secret key. The message may comprise an indication of an encryption and/or communication protocol. The encryption and/or communication protocol may be the same protocol indicated in the message sent by the user device 301 in step 340.

Performing the handshake may comprise determining a master secret. The user device 301 and/or the networking device 306 may determine the master secret. The master secret may be determined using the random number of the user device 301, the random number of the networking device 306, and/or the premaster secret. The user device 301 may send a message (e.g., a "Change Cipher Spec" message) to the networking device 306 indicating that subsequent messages should be protected with the exchanged keys. The user device 301 may send the networking device a message (e.g., a "Finished" message) indicating a hash of a message flow of the handshake. The hash may be encrypted using the exchanged keys.

The networking device 306 may send the user device 301 a message based on receiving one or more of the messages from the user device 301. The message may comprise a "Change Cipher Spec" message. The message may indicate that the networking device 306 is ready to communicate using the exchanged keys. The message may comprise the hash of a message flow of the handshake. The hash may be encrypted with the exchanged keys.

At step 343, the handshake of step 342 may be finished. Based on completion of the handshake, there may be an encrypted channel (e.g., connection, communication session, etc.) between the user device 301 and the networking device 306 (e.g., between the indicated ports of the devices). Based on completion of the handshake, the user device 301 and the networking device 306 may communicate using the encrypted channel.

At step 344, the user device 301 may send a request. The request may comprise a request associated with the computing device 303. For example, the request may comprise a request for data, a service, and/or content from the computing device 303. The request may comprise data for the computing device 303. The request may comprise a request to communicate with the computing device 303.

The user device 301 may send the request to the networking device 306. The request may be sent based on performing the handshake in step 339 and/or the handshake in step 342. The request may be sent using the channel set-up by performing the handshake in step 342. The request may comprise one or more chunks of data. The chunks may comprise one or more data packets. The request may comprise a stream of data packets.

One or more of the data packets may comprise identifying information. The identifying information may comprise an address (e.g., a MAC address, IP address, URL, port number, etc.) of the user device 301, an address of the computing device 303, an address of the privacy gateway, an address of the networking device 306, and/or a geographic location of the user device 301. The identifying information may comprise an address of a router, such as a router at a premises where the user device 301 is located. The data packet may comprise other data, such as a time that the packet was sent, a query parameter, a header, and/or a cookie.

The one or more data packets may comprise one or more layers of encryption. For example, a data packet may be encrypted using the public key of the computing device 303 and/or the public key of the networking device 306. The user device 301 may encrypt a portion of the data packet using the public key of the computing device 303. The user device 301 may not encrypt a portion of the data packet needed to send the data packet to the networking device 306, such as an address of the networking device 306. The user device 301 may encrypt a portion the encrypted data packet using the public key of the networking device.

The networking device 306 may receive the request. The networking device 306 may decrypt one or more data packets of the request. The networking device 306 may decrypt a data packet using a private key of the networking device 306. A packet may comprise more than one layer of encryption. An outermost layer of encryption of the packet may comprise an encryption with the public key of the networking device 306. The networking device may decrypt the outermost layer of the packet.

Based on decrypting at least a portion of one or more data packets, the networking device may determine that the request was sent by the computing device 303, such as based on the address of the computing device. Based on decrypting at least a portion of the data packets, the networking device 206 may determine that the request is associated with the computing device 303, such as based on an address of the computing device 303.

At step 345, the networking device 306 and the privacy concentrator 309 may perform a handshake. The handshake may be performed based on the networking device 306 receiving the request in step 344. The handshake may comprise a TCP handshake.

The handshake may comprise the networking device 306 sending one or more packets. The networking device 306 may send one or more packets to the privacy concentrator 309. A packet may comprise a TCP packet. The packet may comprise a SYN packet. The packet may comprise an IP packet. The packet may comprise an indication of a sequence number. The sequence number may be determined by the networking device 306. The sequence number may be randomly determined. The packet may comprise an indication of one or more port numbers. The port numbers may comprise a source number, a client number, a destination number, and/or a server number. The port numbers may comprise a port number of the networking device 306. The port numbers may comprise a port number of the privacy concentrator 309.

The handshake may comprise the privacy concentrator 309 sending one or more packets. The privacy concentrator 309 may send the one or more packets to the networking device 306. The privacy concentrator 309 may send the one or more packets based on receiving one or more packets from the networking device 306. A packet may comprise a TCP packet. The packet may comprise an IP packet. The packet may comprise a SYN ACK packet. The packet may comprise an indication that the privacy concentrator 309 received the one or more packets from the networking device 306. The packet may comprise an indication of a sequence number. The sequence number may be determined by the privacy concentrator 309. The sequence number may be randomly determined. The packet may comprise an indication of one or more port numbers. The packet may comprise an indication of an acknowledgement number. The acknowledgement number may comprise the sequence number associated with the networking device 306 plus one.

The handshake may comprise the networking device 306 sending one or more packets. The client may send the one or more packets to the privacy concentrator 309. The networking device 306 may send the one or more packets based on receiving the one or more packets from the privacy concentrator 309. A packet may comprise an indication that the networking device 306 received the one or more packets from the privacy concentrator 309. The one or more packets may comprise an ACK packet. A packet may comprise an indication of the source and/or networking device 306 port. The packet may comprise an indication of the destination and/or privacy concentrator 309 port. The packet may comprise an indication of a new sequence number associated with the networking device 306. The new sequence number may comprise the initial sequence number associated with the networking device 306 plus one. The packet may comprise an indication of the acknowledgement number. The acknowledgement number may comprise the sequence number associated with the privacy concentrator 309 plus one. Based on performing the handshake, a communication session may be established.

At step 346, the networking device 306 may send a request. The networking device 306 may send the request to the privacy concentrator 309. The networking device 306 may send the request based on performing the handshake in step 345. The networking device 306 may send the request via the communication session established in step 345. The networking device 306 may send the request based on performing the handshake in step 329. The request may comprise an indication of the request sent by the user device 301 in step 328. The request may comprise one or more of the data packets sent by the user device 301 in step 328. The request may comprise one or more data packets received from the user device 301 that were decrypted or at least partially decrypted by the networking device.

The request may comprise a clear-text request. The clear-text request may be unencrypted. The clear-text request may comprise a portion that is unencrypted. The clear-text request may not have a layer of encryption. The clear-text request may comprise one or more data packets with one or more layers of encryption removed, such as by the networking device 306. The privacy concentrator 309 may receive the request.

At step 347, the privacy concentrator 309 and the computing device 303 may perform a handshake. The privacy concentrator 309 may perform the handshake based on receiving the request in step 346. The handshake may comprise a TCP handshake.

The handshake may comprise the privacy concentrator 309 sending one or more packets. The privacy concentrator 309 may send one or more packets to the computing device 303. A packet may comprise a TCP packet. The packet may comprise a SYN packet. The packet may comprise an IP packet. The packet may comprise an indication of a sequence number. The sequence number may be determined by the privacy concentrator 309. The sequence number may be randomly determined. The packet may comprise an indication of one or more port numbers. The port numbers may comprise a source number, a client number, a destination number, and/or a server number. The port numbers may comprise a port number of the privacy concentrator 309. The port numbers may comprise a port number of the computing device 303.

The handshake may comprise the computing device 303 sending one or more packets. The computing device 303 may send the one or more packets to the privacy concentrator 309. The computing device 303 may send the one or more packets based on receiving one or more packets from the privacy concentrator 309. A packet may comprise a TCP packet. The packet may comprise an IP packet. The packet may comprise a SYN ACK packet. The packet may comprise an indication that the computing device 303 received the one or more packets from the privacy concentrator 309. The packet may comprise an indication of a sequence number. The sequence number may be determined by the computing device 303. The sequence number may be randomly determined. The packet may comprise an indication of one or more port numbers. The packet may comprise an indication of an acknowledgement number. The acknowledgement number may comprise the sequence number associated with the privacy concentrator 309 plus one.

The handshake may comprise the privacy concentrator 309 sending one or more packets. The privacy concentrator 309 may send the one or more packets to the computing device 303. The privacy concentrator 309 may send the one or more packets based on receiving the one or more packets from the computing device 303. A packet may comprise an indication that the privacy concentrator 309 received the one or more packets from the computing device 303. The one or more packets may comprise an ACK packet. A packet may comprise an indication of the source and/or the privacy concentrator 309. The packet may comprise an indication of the destination and/or computing device 303 port. The packet may comprise an indication of a new sequence number associated with the privacy concentrator 309. The new sequence number may comprise the initial sequence number associated with the privacy concentrator 309 plus one. The packet may comprise an indication of the acknowledgement number. The acknowledgement number may comprise the sequence number associated with the computing device 303 plus one. Based on performing the handshake, a communication session may be established.

At step 348, the privacy gateway 309 may send a message. The privacy gateway 309 may send the message via the network 304. The privacy concentrator 309 may send the message to the computing device 303. The privacy gateway 309 may send the message based on performing the handshake in step 347. The privacy concentrator 309 device may send the message via the communication session established in step 347. The message may comprise an indication to initiate another handshake, such as a TLS and/or SSL handshake. The message may comprise a "Client Hello" message. The message may be sent based on performing the handshake in step 331. The computing device 303 may receive the response.

The message may comprise a packet, such as a TCP packet. The message may comprise an indication of an encryption and/or communication protocol supported by the privacy concentrator 309. The indication of the encryption and/or communication protocol may comprise an indication of a highest version of an encryption and/or communication protocol supported by the privacy concentrator 309, such as a highest version of TLS protocol that the privacy concentrator 309 supports. The message may comprise an indication of a random number generated by the privacy concentrator 309. The message may comprise an indication of one or more cipher suites supported by the privacy concentrator 309. The cipher suits may comprise one or more cryptographic algorithms, such as a server authentication algorithm, a key exchange algorithm, a bulk encryption algorithm, and/or a message integrity algorithm. The message may comprise an indication of a compression algorithm supported by the privacy concentrator 309. The message may comprise an indication of a session identifier. The session identifier may be used to resume an existing communication session instead of performing a handshake again. The computing device 303 may receive the message.

At step 349, a handshake may be performed between the privacy concentrator 309 and the computing device 303. The handshake may be performed based on receiving the request in step 330. The handshake may be performed based on sending and/or receiving the message in step 332. The handshake may be performed based on a TCP connection being opened, such as by performing the handshake in step 331. The handshake may comprise an SSL handshake.

Performing the handshake may comprise sending one or more digital certificates. For example, the privacy concentrator 309 may receive a certificate from the computing device 303. The certificate of the computing device 303 may comprise an indication of a public key associated with the computing device 303.

Performing the handshake may comprise the privacy concentrator 309 validating the certificate. Validating the certificate may comprise determining that the certificate is signed by a CA. Validating the certificate may comprise determining that the certification authority is known and/or trusted. For example, the privacy concentrator 309 may have access and/or have stored a list of CA's that are trusted. The privacy concentrator 309 may determine that the CA that signed the certificate is on the list.

Performing the handshake may comprise the privacy concentrator 309 receiving one or more messages from the computing device 303. The message may comprise a request for a certificate associated with the privacy concentrator 309. The request may comprise an indication of one or more certificate authorities trusted by the computing device 303. The request may comprise an indication of a type of the certificate. The message may comprise an indication that the computing device 303 is finished performing its steps of the handshake. For example, the message may comprise a "Server Hello Done" message.

Performing the handshake may comprise the privacy concentrator 309 sending a certificate of the privacy concentrator 309 to the computing device 303. The privacy concentrator 309 may send the certificate to the computing device 303 based on receiving the request for the certificate from the computing device 303 The networking device 206 may send the certificate of the privacy concentrator 309 to a CA. privacy concentrator 309 may send the certificate to a CA indicated in the request. If the certificate of the privacy concentrator 309 comprises a certificate of a certificate chain, the privacy concentrator 309 may send its public certificate and one or more other certificates in the chain to a root CA of the chain.

Performing the handshake may comprise the computing device 303 validating the certificate of the privacy concentrator 309. Validating the certificate may comprise determining that the certificate is signed by a known and/or trusted CA. The known and/or trusted CA may comprise a CA in the list sent to the privacy concentrator 309. If the certificate is of a certificate chain, validating the certificate may comprise determining that one or more certificates in the chain and signed by a known and/or trusted CA.

Performing the handshake may comprise the privacy concentrator 309 encrypting a premaster secret key. The privacy concentrator 309 may encrypt the premaster secret key based on validating the certificate of the computing device 303. The privacy concentrator 309 may use the public key from the certificate to encrypt a premaster secret key. The premaster key may comprise a shared secret between the privacy concentrator 309 and the computing device 303.

Performing the handshake may comprise the privacy concentrator 309 sending computing device 303 a message. The message may comprise a "Client Key Exchange" message. The message may comprise the encrypted premaster secret key to the computing device 303. The message may comprise an indication of an encryption and/or communication protocol. The encryption and/or communication protocol may be the same protocol indicated in the message sent by the privacy concentrator 309 in step 320.

Performing the handshake may comprise determining a master secret. The privacy concentrator 309 and/or the computing device 303 may determine the master secret. The master secret may be determined using the random number of the privacy concentrator 309, the random number of the computing device 303, and/or the premaster secret. The privacy concentrator 309 may send a message (e.g., a "Change Cipher Spec" message) to the computing device 303 indicating that subsequent messages should be protected with the exchanged keys. The privacy concentrator 309 may send the computing device 303 a message (e.g., a "Finished" message) indicating a hash of a message flow of the handshake. The hash may be encrypted using the exchanged keys.

The privacy concentrator 309 may receive a message from the computing device 303. The computing device 303 may send the message based on receiving one or more of the messages from the privacy concentrator 309. The message may comprise a "Change Cipher Spec" message. The message may indicate that the computing device 303 is ready to communicate using the exchanged keys. The message may comprise the hash of a message flow of the handshake. The hash may be encrypted with the exchanged keys. At step 350, the handshake may be finished.

At step 351, the privacy concentrator 309 may send a request. The privacy concentrator 309 may send the request to the computing device 303. The request may comprise one or more of the data packets from the user device 301 received from the networking device 306 in step 330. The privacy concentrator 309 may encrypt one or more of the data packets, such as using the public key of the computing device 303. The privacy concentrator 309 may encrypt a portion of a data packet. For example, the privacy concentrator 309 may not encrypt a portion of the data packet for routing the data packet to the computing device 303, such as an address of the computing device 303. The computing device 303 may receive the request.

At step 352, the privacy concentrator 309 may receive a response. The response may comprise a response to the request send and/or received in step 351. The response may be encrypted. For example, the response may be encrypted using a public key of the privacy concentrator 309. The privacy concentrator 309 may decrypt at least a portion of the response, such as using a private key of the privacy concentrator 309.

At step 353, the privacy concentrator 309 may send a response. The privacy concentrator 309 may send the response to the networking device 306. The response may be sent via the communication channel established in step 345. The response may comprise an indication of the response received in step 352. The response may comprise a clear-text response. The clear-text response may comprise the decrypted response received from the computing device 303. The networking device 306 may receive the response.

At step 354, the networking device 306 may send a response. The networking device 306 may send the response to the user device 301. The response may be sent using the channel set-up by performing the handshake in step 342. The response may comprise an indication of the response received in step 353. The networking device 206 may encrypt the response received in step 353, such as using a public key of the user device 301. The networking device 306 may send the encrypted response to the user device 301. The user device 301 may receive the response.

Figure 4:
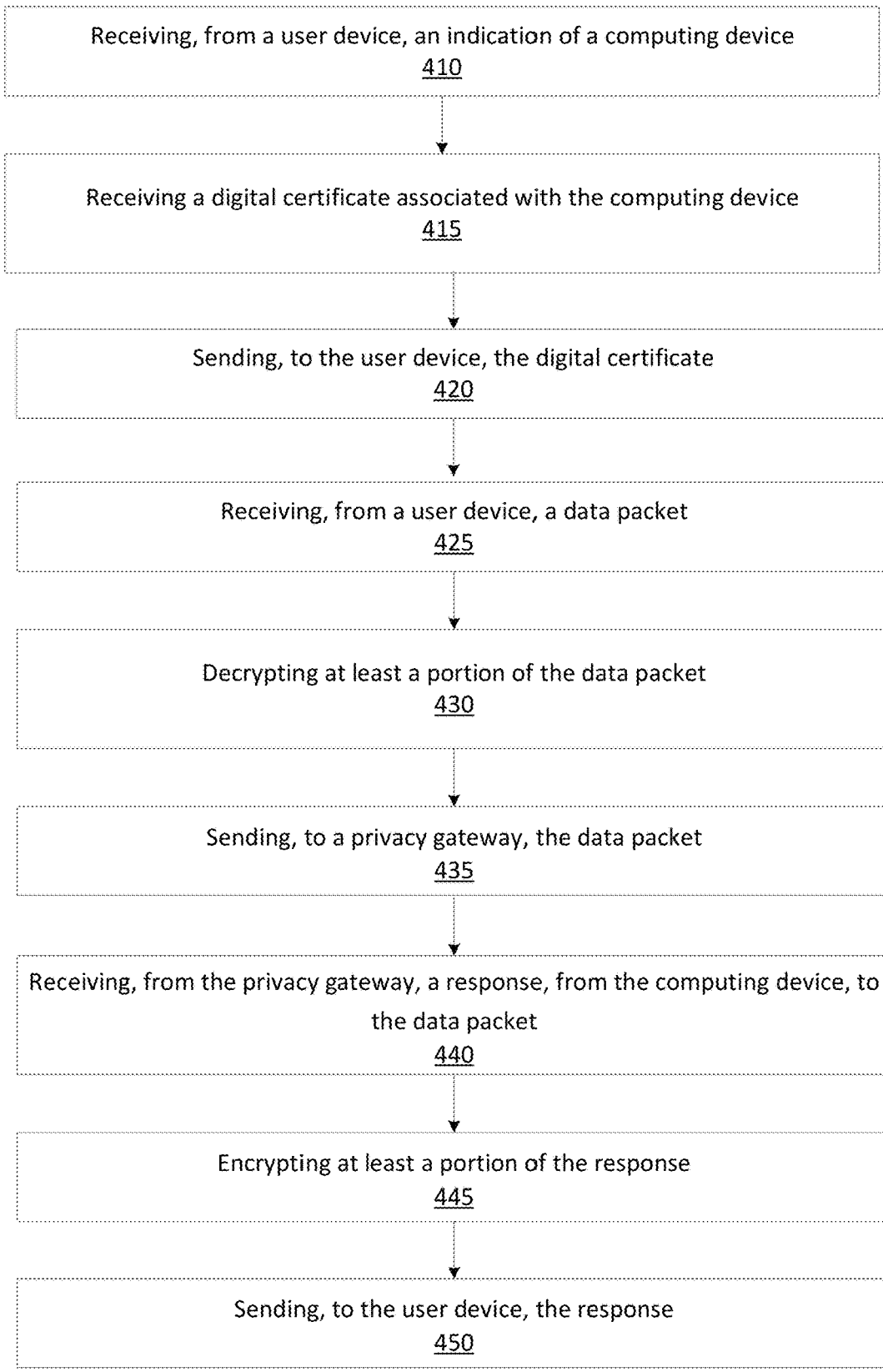
FIG. 4 shows an example method.

FIG. 4 shows an example method 400. The method 400 may be performed by an element of the system 100 shown in FIG. 1 or any other computing device. The method 400 may be performed by a networking device (e.g., the networking device 106 in FIG. 1, the networking device 206 in FIG. 2, and/or the networking device 306 in FIG. 3). At step 410, an indication of a computing device may be received. The indication of the computing device may be received from a user device. The user device may comprise user device 101 in FIG. 1, user device 201 in FIG. 2, and/or user device 301 in FIG. 3. The indication of the computing device may be received based on the user device navigating to a website over HTTPS. The indication of the computing device may be received based on a browser on the user device 201 generating a query for the website's origin server, such as the computing device.

The receiving the indication of the computing device may comprise performing a handshake with the user device, such as in one or more of steps 217, 218, 224, 225, 226, and/or 228 of method 200 in FIG. 2 and/or one or more of steps 339, 340, 341, 342, 343, and/or 344 of method 300 in FIG. 3. The receiving the indication of the computing device may comprise receiving one or more data packets from the user device. The data packets may comprise one or more TCP packets, SYN packets, and/or IP packets.

The indication of the computing device may comprise a port number of the computing device. The indication of the computing device may comprise an address associated with the computing device. The computing device may comprise the computing device 103 in FIG. 1, the computing device 203 in FIG. 2, and/or the computing device 303 in FIG. 3.

At step 415, a digital certificate may be received. The digital certificate may be associated with the computing device. The digital certificate may be received based on communicating with the computing device. Communicating with the computing device may comprise sending the computing device a request for the digital certificate. Communicating with the computing device may comprise performing a handshake with the computing device, such as in one or more of steps 219, 220, 221, 222, and/or 223 of the method 200 in FIG. 2.

At step 420, the digital certificate may be sent. The digital certificate may be sent to the user device. The digital certificate may be sent to the user device via a communication session established, such as in step 410 and/or by performing a handshake. The digital certificate may be signed by a certificate authority, such as a local certificate authority. A key, such as a public key, associated with the networking device may be sent to the user device. The public key may be signed by a certificate authority, such as a local certificate authority.

At step 425, a data packet may be received. The data packet may be received from the user device. The data packet may be received based on the digital certificate in step 420. The data packet may be received based on the user device authenticating the digital certificate. One or more of the data packets may comprise identifying information. The identifying information may comprise an address (e.g., a MAC address, IP address, URL, port number, etc.) of the user device, an address of the computing device, an address of the privacy gateway, an address of the networking device, and/or a geographic location of the user device. The identifying information may comprise an address of a router, such as a router at a premises where the user device is located. The data packet may comprise other data, such as a time that the packet was sent, a query parameter, a header, and/or a cookie.

The one or more data packets may comprise one or more layers of encryption. For example, a data packet may be encrypted using the public key of the computing device and/or the public key of the networking device. The data packet may be encrypted using the public key of the computing device, such as by the user device. A portion of the data packet needed to send the data packet to the networking device, such as an address of the networking device, may remain unencrypted.

At step 430, at least a portion of a data packet may be decrypted. The portion of the data packet may be decrypted using a private key of the networking device. A packet may comprise more than one layer of encryption. An outermost layer of encryption of the packet may comprise an encryption with the public key of the networking device. The outermost layer of the packet may be decrypted.

Based on decrypting at least a portion of one or more data packets, the networking device may determine that the request was sent by the user device, such as based on the data packet comprising an indication of the user device. Based on decrypting at least a portion of the data packets, the networking device may determine that the request is associated with the computing device, such as based the data packet comprising an indication of the computing device.

At step 435, the data packet may be sent. The data packet may be sent to a privacy gateway. The privacy gateway may comprise the privacy gateway 109 in FIG. 1, the privacy gateway in FIG. 2, and/or the privacy gateway 309 in FIG. 3. The data packet may be sent via a communication session established with the privacy gateway. The communication session may be established by performing a handshake. The communication session may be established using a method similar to one or more of step 229 and/or step 230 in FIG. 2 and/or steps 345 and/or step 346 in FIG. 3.

At step 440, a response may be received. The response may be received from the privacy gateway. The response may be from the computing device. The response may be to the data packet. The response may be received based on the privacy gateway sending the data packet to the computing device. At least a portion of the response may be decrypted, such as by the privacy gateway. The response may comprise data requested by the user device. The response may comprise content, such as a web page, requested by the user device.

At step 445, at least a portion of the response may be encrypted. The portion of the response may be encrypted using a key associated with the user device, such as a public key of the user device. The portion of the response may be encrypted using a key associated with the networking device, such as a private key associated with the networking device.

The portion that is encrypted may comprise a portion that is not needed to be left unencrypted for delivery of the response, such as to the user device. For example, an address on the response may be left unencrypted.

At step 450, the response may be sent to the user device. The response may be sent to the user device using a communication session established in one or more of the prior steps.

Figure 5:
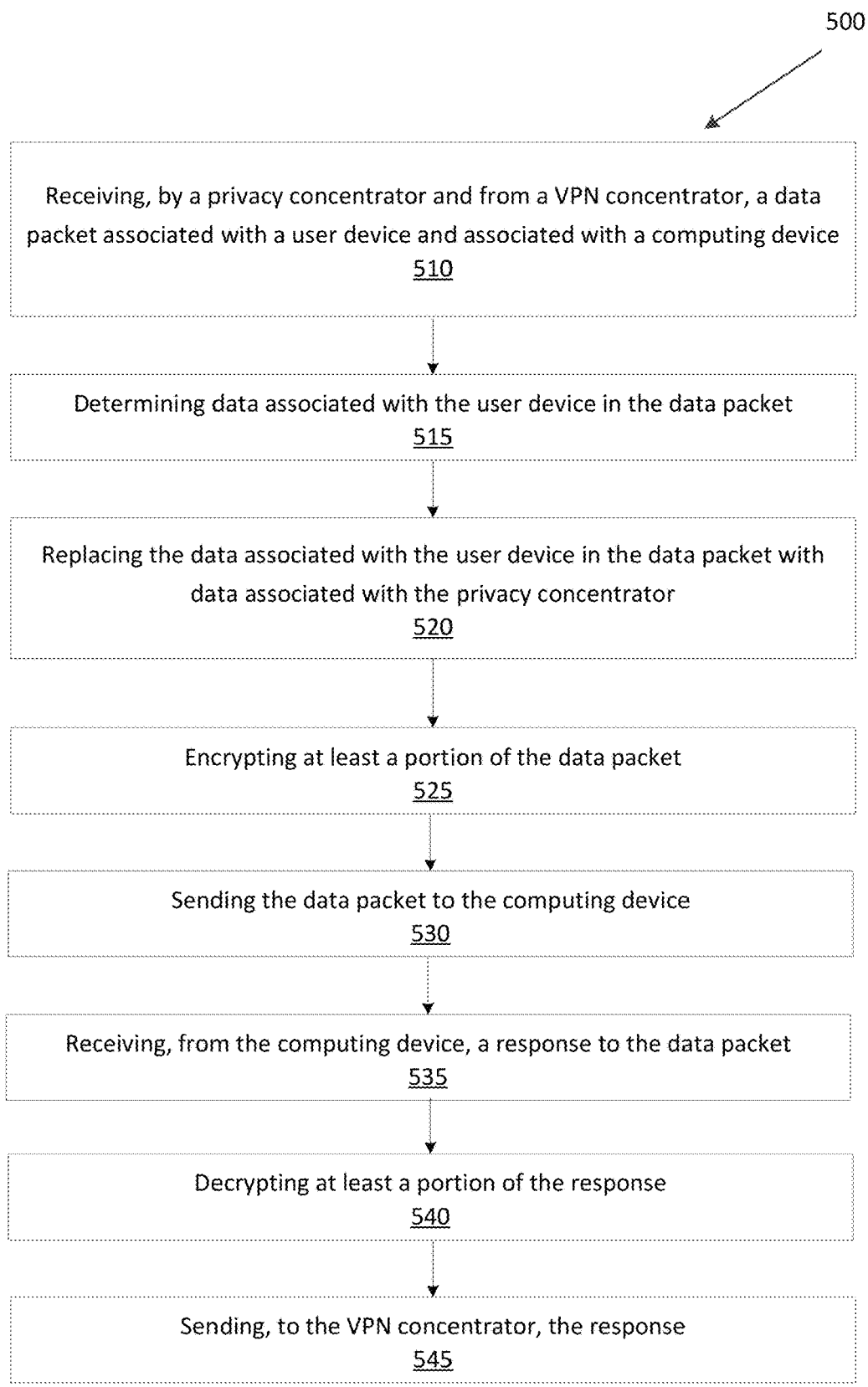
FIG. 5 shows an example method.

FIG. 5 shows an example method 500. The method 500 may be performed by an element of the system 100 shown in FIG. 1 or any other computing device. The method 400 may be performed by a privacy concentrator (e.g., the privacy concentrator 109 in FIG. 1, the privacy concentrator 209 in FIG. 2, and/or the privacy concentrator 309 in FIG. 3).

At step 510, a data packet may be received. The data packet may be received from a networking device. The networking device may comprise the networking device 106 in FIG. 1, the networking device 206 in FIG. 2, and/or the networking device 306 in FIG. 3, as examples. The data packet may be associated with a user device. The user device may comprise user device 101 in FIG. 1, user device 201 in FIG. 2, and/or user device 301 in FIG. 3. For example, the networking device may receive the data packet from the user device and send the data packet to the privacy concentrator.

The data packet may comprise a TCP data packet. The data packet may comprise an indication of a computing device. The computing device may comprise the computing device 103 in FIG. 1, the computing device 203 in FIG. 2, and/or the computing device 303 in FIG. 3. The indication of the computing device may comprise an indication of an address of the computing device. The indication of the computing device may comprise an indication of a port of the computing device.

The data packet may comprise a request associated with the computing device. For example, the data packet may comprise a request for data from the computing device. The data packet may comprise a request for content from the computing device.

At step 515, data associated with the user device in the data packet may be determined. The data associated with the user device may comprise one or more pieces of information. The data associated with the user device may comprise an address of the user device. The data associated with the user device may comprise an address of a router used by the user device. The data associated with the user device may comprise an indication of a geographic location of the user device. The data associated with the user device may comprise a browser running on the user device. The data associated with the user device may comprise a central processing unit (CPU) of the user device. The data associated with the user device may comprise data associated with a user of the user device. Data associated with the user may comprise an account name of the user, an employer of the user, and/or a geographic location of the user. The data associated with the user device may comprise data that is not encrypted in data packets according to a communication protocol, such as HTTPS. The data associated with the user device may be in an HTTP header of the data packet.

At step 520, the data associated with the user device may be replaced. The data may be replaced with data associated with the privacy concentrator. The data associated with the privacy concentrator may comprise an address associated with the privacy concentrator. Replacing the data associated with the user device with the data associated with the privacy concentrator may comprise generating a new data packet comprising the data associated with the privacy concentrator. Replacing the data associated with the user device with the data associated with the privacy concentrator may comprise adding the data associated with the privacy concentrator to the data packet received from the user device.

At step 525, at least a portion of the data packet may be encrypted. The portion of the data packet may be encrypted using a key associated with the computing device, such as a public key associated with the computing device. The key may be received from the networking device.

At step 530, the data packet may be sent. The data packet may be sent to the computing device. The data packet may be sent to the computing device via a communication session. The communication session may have been established prior to step 530. The communication session may be established at step 530. The communication session may be established by performing a handshake with the computing device.

At step 535, a response to the data packet may be received. The response may be received from the computing device. The response may be received via the communication session. The response may be received based on the sending the data packet to the computing device. At least a portion of the response may be decrypted, such as by the privacy gateway. The response may comprise content, such as a web page, requested by the user device.

At step 540, at least a portion of the response may be decrypted. The portion of the response may comprise all portions of the response that are encrypted. The portion may comprise a portion that is encrypted using a key associated with the privacy concentrator, such as a public key of the privacy concentrator. The portion of the response may be decrypted using a private key of the privacy concentrator.

At step 545, a response may be sent. For example, the response may comprise the response to the data packet and/or received from the computing device. The response may be sent to the networking device. The response may be sent to the networking device via a communication session established prior to step 545. The response may be sent to the networking device via a communication session established at step 545.

Figure 6:
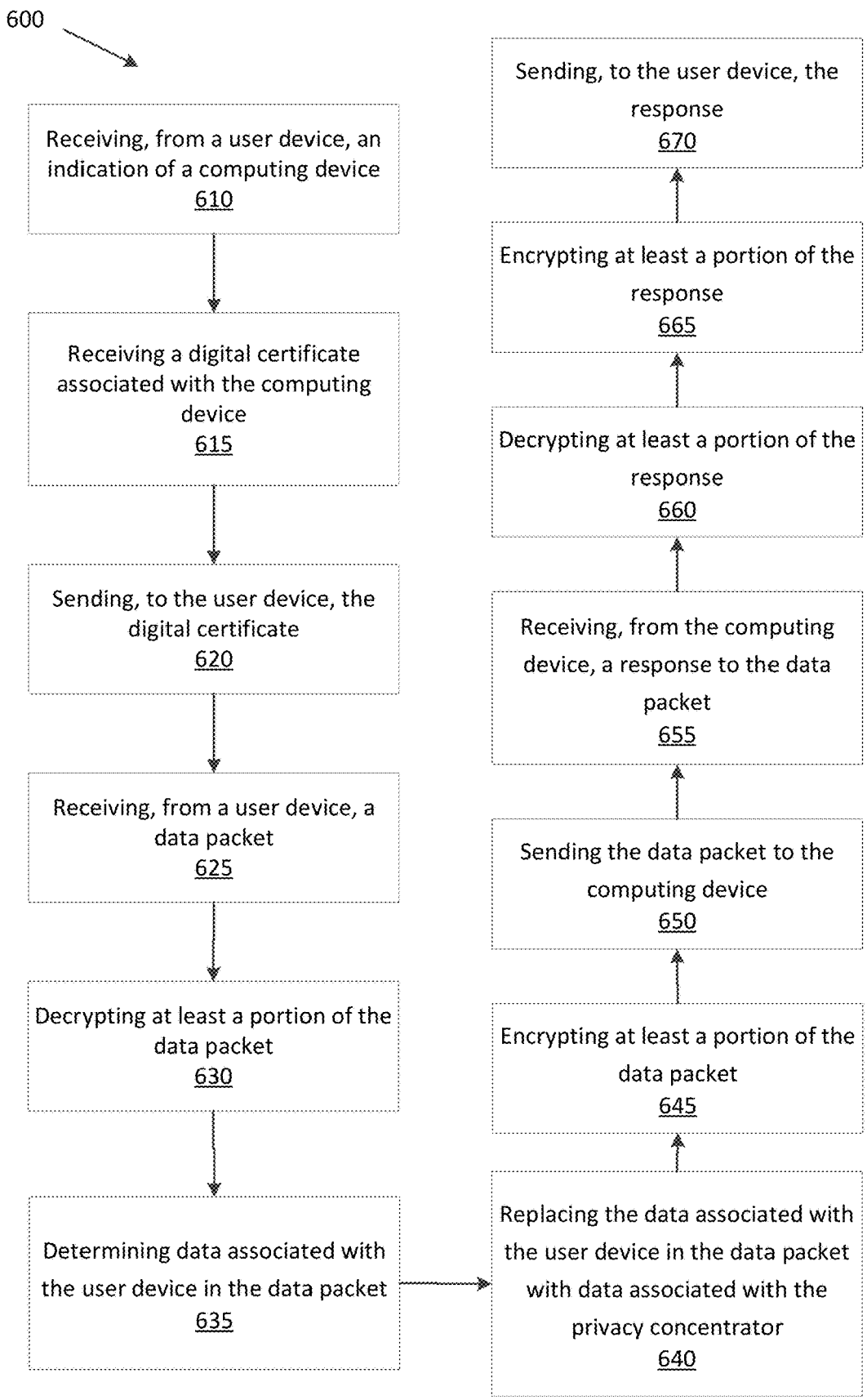
FIG. 6 shows an example method.

FIG. 6 shows an example method 600. The method 600 may be performed by an element of the system 100 shown in FIG. 1 or any other computing device. The method 600 may be performed by a privacy gateway (e.g., the privacy gateway 105 in FIG. 1) or any other computing device. The privacy gateway may comprise a networking device (e.g., the networking device 106 in FIG. 1, the networking device 206 in FIG. 2, and/or the networking device 306 in FIG. 3). The privacy gateway may comprise a privacy concentrator (e.g., the privacy concentrator 109 in FIG. 1, the privacy concentrator 209 in FIG. 2, and/or the privacy concentrator 309 in FIG. 3). The privacy gateway may comprise one device. The privacy gateway may comprise a plurality of devices.

At step 610, an indication of a computing device may be received. The indication of the computing device may be received from a user device. The user device may comprise user device 101 in FIG. 1, user device 201 in FIG. 2, and/or user device 301 in FIG. 3. The indication of the computing device may be received based on the user device navigating to a website over HTTPS. The indication of the computing device may be received based on a browser on the user device 201 generating a query for the website's origin server, such as the computing device.

The receiving the indication of the computing device may comprise performing a handshake with the user device, such as in one or more of steps 217, 218, 224, 225, 226, and/or 228 of method 200 in FIG. 2 and/or one or more of steps 339, 340, 341, 342, 343, and/or 344 of method 300 in FIG. 3. The receiving the indication of the computing device may comprise receiving one or more data packets from the user device. The data packets may comprise one or more TCP packets, SYN packets, and/or IP packets.

The indication of the computing device may comprise a port number of the computing device. The indication of the computing device may comprise an address associated with the computing device. The computing device may comprise the computing device 103 in FIG. 1, the computing device 203 in FIG. 2, and/or the computing device 303 in FIG. 3.

At step 615, a digital certificate may be received. The digital certificate may be associated with the computing device. The digital certificate may be received based on communicating with the computing device. Communicating with the computing device may comprise sending the computing device a request for the digital certificate. Communicating with the computing device may comprise performing a handshake with the computing device, such as in one or more of steps 219, 220, 221, 222, and/or 223 of the method 200 in FIG. 2.

At step 620, the digital certificate may be sent. The digital certificate may be sent to the user device. At step 420, the digital certificate may be sent. The digital certificate may be sent to the user device. The digital certificate may be sent to the user device via a communication session established, such as in step 410 and/or by performing a handshake. The digital certificate may be signed by a certificate authority, such as a local certificate authority. A key, such as a public key, associated with the networking device may be sent to the user device. The public key may be signed by a certificate authority, such as a local certificate authority.

At step 625, a data packet may be received. The data packet may be received from the user device. The data packet may be received based on the digital certificate in step 620. The data packet may be received based on the user device validating the digital certificate. One or more of the data packets may comprise identifying information. The identifying information may comprise an address (e.g., a MAC address, IP address, URL, port number, etc.) of the user device, an address of the computing device, an address of the privacy gateway, an address of the networking device, and/or a geographic location of the user device. The identifying information may comprise an address of a router, such as a router at a premises where the user device is located. The data packet may comprise other data, such as a time that the packet was sent, a query parameter, a header, and/or a cookie.

The one or more data packets may comprise one or more layers of encryption. For example, a data packet may be encrypted using the public key of the computing device and/or the public key of the networking device. The data packet may be encrypted using the public key of the computing device, such as by the user device. A portion of the data packet needed to send the data packet to the networking device, such as an address of the networking device, may remain unencrypted.

At step 630, at least a portion of a data packet may be decrypted. The portion of the data packet may be decrypted using a private key of the networking device. A packet may comprise more than one layer of encryption. An outermost layer of encryption of the packet may comprise an encryption with the public key of the networking device. The outermost layer of the packet may be decrypted.

Based on decrypting at least a portion of one or more data packets, the networking device may determine that the request was sent by the user device, such as based on the data packet comprising an indication of the user device. Based on decrypting at least a portion of the data packets, the networking device may determine that the request is associated with the computing device, such as based the data packet comprising an indication of the computing device.

At step 635, data associated with the user device in the data packet may be determined. The data associated with the user device may comprise one or more pieces of information. The data associated with the user device may comprise an address of the user device. The data associated with the user device may comprise an address of a router used by the user device. The data associated with the user device may comprise an indication of a geographic location of the user device. The data associated with the user device may comprise a browser running on the user device. The data associated with the user device may comprise a central processing unit (CPU) of the user device. The data associated with the user device may comprise data associated with a user of the user device. Data associated with the user may comprise an account name of the user, an employer of the user, and/or a geographic location of the user. The data associated with the user device may comprise data that is not encrypted in data packets according to a communication protocol, such as HTTPS. The data associated with the user device may be in an HTTP header of the data packet.

At step 640, the data associated with the user device may be replaced. The data may be replaced with data associated with the privacy concentrator and/or the privacy gateway. The data associated with the privacy concentrator and/or the privacy gateway may comprise an address associated with the privacy concentrator and/or the privacy gateway. Replacing the data associated with the user device with the data associated with the privacy concentrator and/or the privacy gateway may comprise generating a new data packet comprising the data associated with the privacy concentrator and/or the privacy gateway. Replacing the data associated with the user device with the data associated with the privacy concentrator and/or the privacy gateway may comprise adding the data associated with the privacy concentrator and/or the privacy gateway to the data packet received from the user device.

At step 645, at least a portion of the data packet may be encrypted. The portion of the data packet may be encrypted using a key associated with the computing device, such as a public key associated with the computing device.

At step 650, the data packet may be sent. The data packet may be sent to the computing device. The data packet may be sent to the computing device via a communication session. The communication session may have been established prior to step 650. The communication session may be established at step 650. The communication session may be established by performing a handshake with the computing device.

At step 655, a response to the data packet may be received. The response may be received from the computing device. The response may be received via the communication session. The response may be received based on the sending the data packet to the computing device. At least a portion of the response may be decrypted, such as by the privacy gateway. The response may comprise content, such as a web page, requested by the user device.

At step 660, at least a portion of the response may be decrypted. The portion of the response may comprise all portions of the response that are encrypted. The portion may comprise a portion that is encrypted using a key associated with the privacy concentrator, such as a public key of the privacy concentrator. The portion of the response may be decrypted using a private key of the privacy concentrator.

At step 665, at least a portion of the response may be encrypted. The portion of the response may be encrypted using a key associated with the user device, such as a public key of the user device. The portion of the response may be encrypted using a key associated with the networking device, such as a private key associated with the networking device.

The portion that is encrypted may comprise a portion that is not needed to be left unencrypted for delivery of the response, such as to the user device. For example, an address on the response may be left unencrypted.

At step 670, the response may be sent. The response may be sent to the user device. The response may be sent to the user device using a communication session established in one or more of the prior steps.

Figure 7:
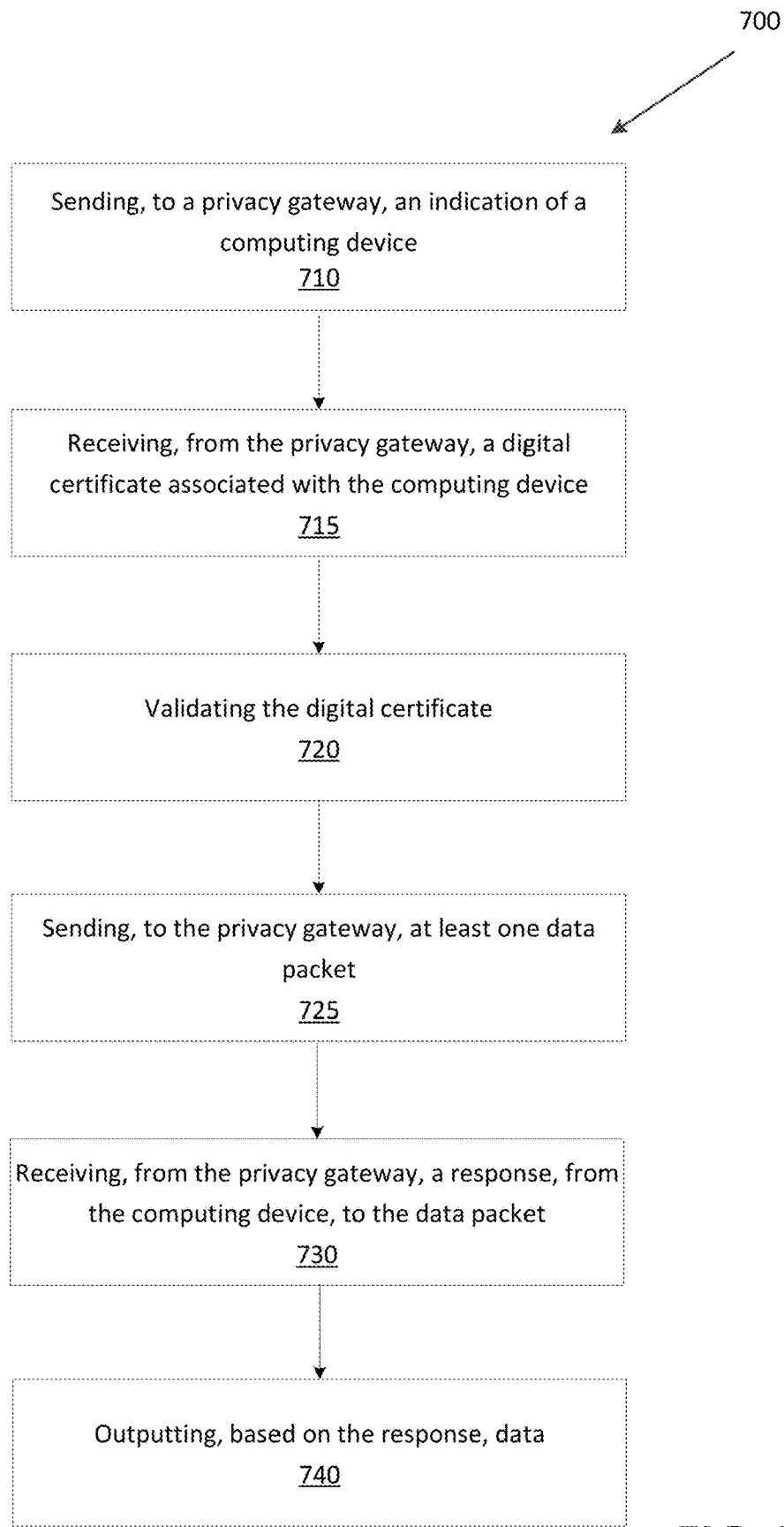
FIG. 7 shows an example method.

FIG. 7 shows an example method 700. The method 700 may be performed by an element of the system 100 shown in FIG. 1. The method 700 may be performed by a user device (e.g., the user device 101 in FIG. 1, the user device 201 in FIG. 2, and/or the user device 301 in FIG. 3), or any other computing device.

At step 710, an indication of a computing device may be sent. The computing device may comprise the computing device 103 in FIG. 1, the computing device 203 in FIG. 2, and/or the computing device 303 in FIG. 3. The indication of the computing device may be sent to a privacy gateway (e.g., the privacy gateway 105 in FIG. 1). The privacy gateway may comprise a networking device (e.g., the networking device 106 in FIG. 1, the networking device 206 in FIG. 2, and/or the networking device 306 in FIG. 3). The privacy gateway may comprise a privacy concentrator (e.g., the privacy concentrator 109 in FIG. 1, the privacy concentrator 209 in FIG. 2, and/or the privacy concentrator 309 in FIG. 3). The privacy gateway may comprise one device. The privacy gateway may comprise a plurality of devices.

The indication of the computing device may be sent based on a user of the user device navigating to a website, such as over HTTPS. The indication of the computing device may be sent based on a browser on the user device generating a query for the website's origin server, such as the computing device.

At step 715, a digital certificate may be received. The digital certificate may be associated with the computing device. The digital certificate may be received from the privacy gateway and/or the networking device. The digital certificate may be received via a communication session with the privacy gateway and/or the networking device. The communication session may be established prior to step 715.

The communication session may be established at step 715. The communication session may be established by performing a handshake.

The digital certificate may be signed by a certificate authority, such as a local certificate authority. A key, such as a public key, associated with the networking device and/or the privacy gateway may be received. The public key may be received from the networking device and/or the privacy gateway. The public key may be signed by a certificate authority, such as a local certificate authority.

At step 720, the digital certificate may be validated. Validating the digital certificate may comprise determining that the certificate is signed by a CA. Validating the digital certificate may comprise determining that the certification authority is known and/or trusted. For example, a list of certification authorities that are trusted may be stored and/or accessible. The digital certificate may be validated based on determining that the CA that signed the certificate is on the list.

Validating the digital certificate may comprise that the certificate matches a previously received digital certificate. The previously received digital certificate may be known to be associated with a trusted device, such as by previously validating the digital certificate. The previously received digital certificate and/or an indication of the previously received digital certificate may be stored, such as to the user device.

At step 725, at least one data packet may be sent. The data packet may be sent to the privacy gateway and/or the networking device. The data packet may be sent based on validating the digital certificate in step 720. The data packet may comprise identifying information. The identifying information may comprise an address (e.g., a MAC address, IP address, URL, port number, etc.) of the user device, an address of the computing device, an address of the privacy gateway, an address of the networking device, and/or a geographic location of the user device. The identifying information may comprise an address of a router, such as a router at a premises where the user device is located. The data packet may comprise other data, such as a time that the packet was sent, a query parameter, a header, and/or a cookie.

The data packet may comprise one or more layers of encryption. For example, the data packet may be encrypted using the public key of the computing device and/or the public key of the networking device and/or the privacy gateway. The data packet may be encrypted using the public key of the computing device, such as by the user device. A portion of the data packet needed to send the data packet to the networking device, such as an address of the networking device, may remain unencrypted.

At step 730, a response may be received. The response may be received from the privacy gateway and/or the networking device. The response may be received via a communication session, such as a communication session between the user device and the privacy gateway and/or the networking device. The communication session may be established at step 730. The communication session may be established prior to the step 730 and/or at a previous step in the method 700.

The response may comprise a response to the data packet. At least a portion of the response may be encrypted. The portion of the response may be encrypted using a key associated with the user device, such as a public key of the user device. The portion of the response may be encrypted using a key associated with the privacy gateway and/or the networking device, such as a private key associated with the privacy gateway and/or the networking device.

The portion that is encrypted may comprise a portion that is not needed to be left unencrypted for delivery of the response, such as to the user device. For example, an address on the response may be left unencrypted.

At step 740, data may be output. The data may be output based on the response. The data may comprise an indication of the response. If the response comprises content, outputting the data may comprise outputting the content. The data may be output via the user device, such as via a display of the user device. The data may be output via a device in communication with the user device, such as via an external display device. The data may be output via a web browser displayed via the user device.

Figure 8:
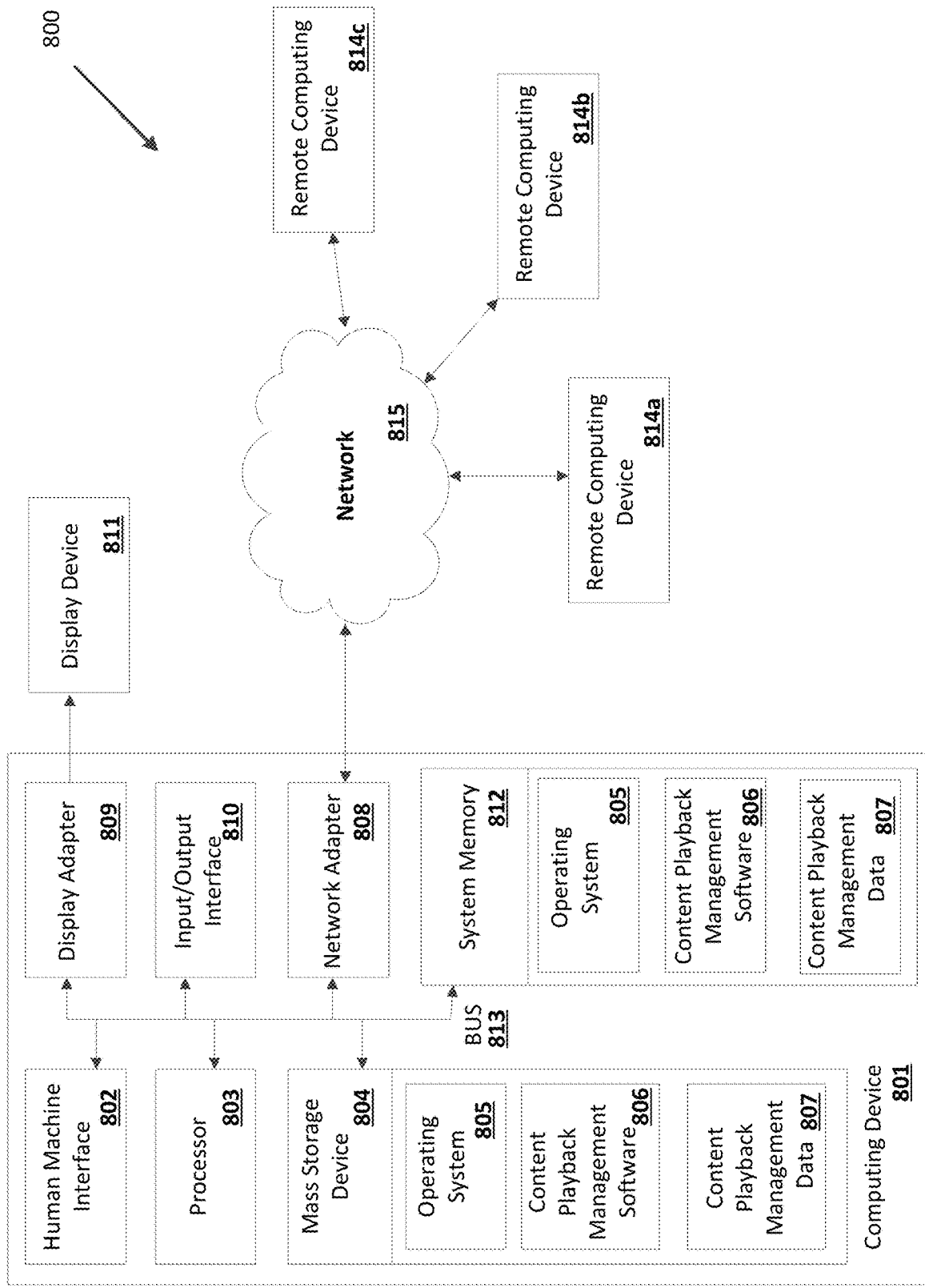
FIG. 8 shows an example system.

FIG. 8 shows an example system 800. The system 800 may comprise a computing device 801. The computing device 801 may comprise one or more of the devices in FIG. 1, FIG. 2, and/or FIG. 3. The computing device 801 may comprise a system bus 813. The system bus 813 may comprise one or more bus structures, including a memory bus or memory controller, a peripheral bus, an accelerated graphics port, and a processor or local bus using any of a variety of bus architectures. The architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description may also be implemented over a wired or wireless network connection and the subsystems, including the processor 803, a mass storage device 804, an operating system 805, content playback management software 806, content playback management data 807, a network adapter 808, system memory 812, an Input/Output Interface 810, a display adapter 809, a display device 811, and a human machine interface 802, may be contained within one or more remote computing devices 814a,b,c at physically separate locations, connected through buses of this form, in effect implementing a fully distributed system.

The computing device 801 may comprise a variety of computer readable media. Exemplary readable media may be any available media that is accessible by the computing device 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 may store data such as content playback management data 807 and/or program modules such as operating system 805 and content playback management software 806 that are immediately accessible to and/or are presently operated on by the processing unit 803.

The computing device 801 may comprise other removable/non-removable, volatile/non-volatile computer storage media. FIG. 8 shows a mass storage device 804 which may provide non-volatile storage of computer code, computer readable instructions, data structures, program modules, and other data for the computing device 801. For example and not meant to be limiting, a mass storage device 804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 804, including for example, an operating system 805 and content playback management software 806. The operating system 805 and content playback management software 806 (or some combination thereof) may comprise elements of the programming and the content playback management software 806. Content playback management data 807 may also be stored on the mass storage device 804. Content playback management data 807 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 801 via an input device (not shown). Examples of such input devices comprise, but are not limited to, a keyboard, a pointing device (e.g., a "mouse"), a microphone, a joystick, a scanner, tactile input devices such as gloves, and other body coverings, and the like. These and other input devices may be connected to the processing unit 803 via a human machine interface 802 that is coupled to the system bus 813, but may be connected by other interface and bus structures, such as a parallel port, game port, an IEEE 1394 Port (also known as a Firewire port), a serial port, or a universal serial bus (USB).

A display device 811 may also be connected to the system bus 813 via an interface, such as a display adapter 809. It is contemplated that the computing device 801 may have more than one display adapter 809 and the computing device 801 may have more than one display device 811. For example, a display device may be a monitor, an LCD (Liquid Crystal Display), or a projector. In addition to the display device 811, other output peripheral devices may comprise components such as speakers (not shown) and a printer (not shown) which may be connected to the computing device 801 via Input/Output Interface 810. Any step and/or result of the methods may be output in any form to an output device. Such output may be any form of visual representation, including, but not limited to, textual, graphical, animation, audio, tactile, and the like. The display 811 and computing device 801 may be part of one device, or separate devices.

The computing device 801 may operate in a networked environment using logical connections to one or more remote computing devices 814a,b,c. The remote computing devices 814a,b,c, may comprise one or more of the devices from FIG. 1, FIG. 2, and/or FIG. 3. A remote computing device may be a personal computer, portable computer, a smart phone, a server, a router, a network computer, a peer device or other common network node, and so on. Logical connections between the computing device 801 and a remote computing device 814a,b,c may be made via a network 815, such as a local area network (LAN) and a general wide area network (WAN). Such network connections may be through a network adapter 808. A network adapter 808 may be implemented in both wired and wireless environments. Such networking environments are conventional and commonplace in dwellings, offices, enterprise-wide computer networks, intranets, and the Internet.

Application programs and other executable program components such as the operating system 805 are shown herein as discrete blocks, although it is recognized that such programs and components reside at various times in different storage components of the computing device 801, and are executed by the data processor(s) of the computer. An implementation of content playback management software 806 may be stored on or sent across some form of computer readable media. Any of the disclosed methods may be performed by computer readable instructions embodied on computer readable media or any other computing device. Computer readable media may be any available media that may be accessed by a computer. For example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed:

1. A method comprising:
   receiving, by a first computing device and from a plurality of user devices, a plurality of encrypted data packets, wherein the plurality of user devices are located at a plurality of premises and the first computing device is located at a different location than the plurality of premises;
   decrypting at least a portion of at least one encrypted data packet of the plurality of encrypted data packets, wherein the decrypted portion comprises data associated with a user device of the plurality of user devices; and
   sending, to a second computing device, an updated data packet comprising data associated with the first computing device.

2. The method of claim 1, wherein the data associated with the user device comprises at least one of an indication of a location of the user device or an address of the user device.

3. The method of claim 1, wherein the at least one encrypted data packet is encrypted with a plurality of layers of encryption; and
   wherein the decrypting the at least one encrypted data packet comprises decrypting at least one layer of encryption of the plurality of layers of encryption.

4. The method of claim 1, wherein the decrypting the at least one encrypted data packet comprises decrypting the at least one data packet using a key associated with a communication session between the computing device and the user device.

5. The method of claim 1, further comprising:
   sending the user device a digital certificate associated with the second computing device; and
   wherein the receiving the at least one data packet is in response to the sending the user device the digital certificate associated with the second computing device.

6. The method of claim 1, further comprising:
   receiving, from the second computing device, one or more data packets comprising data associated with the first computing device;
   generating, based on the data associated with the first computing device, at least one updated data packet comprising data associated with the user device; and sending, to the user device, the one or more data packets.

7. The method of claim 1, wherein the data associated with the first computing device comprises an address associated with the first computing device.

8. The method of claim 1, wherein the updated data packet comprises a hyper-text transport protocol secure (HTTPS) packet.

9. The method of claim 1, wherein at least one of the data associated with the user device or the data associated with the first computing device comprises a hyper-text transport protocol secure (HTTPS) header.

10. The method of claim 1, further comprising establishing a communication session with the second computing device, wherein the establishing the communication session with the second computing device comprises sending the second computing device a certificate of the user device.

11. The method of claim 1, wherein the updated packet comprises a re-encrypted portion of the decrypted portion.

12. A first computing device comprising:
   one or more processors; and
   instructions that, when executed by the one or more processors, cause the first computing device to:
      receive, from a user device of a plurality of user devices, via a communication session with the user device, an encrypted data packet, wherein the plurality of user devices are located at a plurality of premises and the first computing device is located at a different location than the plurality of premises;
      decrypt at least a portion of the encrypted data packet, wherein the decrypted portion comprises data associated with the user device; and
      send, to a second computing device, an updated data packet comprising data associated with the first computing device.

13. The device of claim 12, wherein the instructions, when executed, further cause the first computing device to establish a communication session with the second computing device; and
   wherein the instructions that cause the first computing device to send the updated data packet comprises sending the updated data packet via the communication session with the second computing device.

14. The device of claim 13, wherein the communication session with the user device comprises a Transmission Control Protocol (TCP) communication session.

15. The device of claim 12, wherein the updated data packet comprises a re-encrypted portion of the decrypted portion.

16. The device of claim 12, wherein the instructions, when executed, further cause the first computing device to maintain at least a portion of the communication session with the user device and at least a portion of a communication session with the second computing device contemporaneously.

17. A system comprising:
   a first computing device; and
   a second computing device configured to:
      receive, from at a device of the plurality of user devices, via a communication session with the user device, an encrypted data packet, wherein the plurality of user devices are located at a plurality of premises and the first computing device is located at a different location than the plurality of premises;
      decrypt at least a portion of the encrypted data packet, wherein the decrypted portion comprises data associated with the user device; and
      send, to the first computing device, an updated data packet comprising data associated with the second computing device.

18. The system of claim 17, wherein the second computing device is further configured to cause deletion of one or more cookies created during a communication session with the user device.

19. The system of claim 17, wherein the updated data packet comprises an indication of a third computing device; and
   wherein the second computing device is configured to generate the updated data packet by encrypting at least a second portion of the data packet with a key associated with the third computing device.

20. The system of claim 17, wherein the second computing device is configured to generate the updated data packet by using at least one of Secure Sockets Layer (SSL) encryption or Transport Layer Security (TLS) encryption.

* * * * *